United States Patent [19]
Faroudja et al.

[11] Patent Number: 6,108,041
[45] Date of Patent: Aug. 22, 2000

[54] HIGH-DEFINITION TELEVISION SIGNAL PROCESSING FOR TRANSMITTING AND RECEIVING A TELEVISION SIGNAL IN A MANNER COMPATIBLE WITH THE PRESENT SYSTEM

[75] Inventors: Yves C. Faroudja, Los Altos Hills; Peter D. Swartz, San Jose; Jack J. Campbell, San Francisco, all of Calif.

[73] Assignee: Faroudja Laboratories, Inc., Sunnyvale, Calif.

[21] Appl. No.: 08/948,539

[22] Filed: Oct. 10, 1997

[51] Int. Cl.[7] .............................. H04N 7/01; H04N 11/20
[52] U.S. Cl. ......................... 348/446; 348/451; 348/431; 348/458; 348/426
[58] Field of Search .................................... 348/446, 451, 348/452, 458, 431, 426, 439; H04N 7/01, 11/20

[56] References Cited

U.S. PATENT DOCUMENTS

| | | |
|---|---|---|
| 3,832,487 | 8/1974 | Niet . |
| 4,272,787 | 6/1981 | Michael et al. . |
| 4,298,888 | 11/1981 | Colles et al. . |
| 4,322,750 | 3/1982 | Lord et al. . |
| 4,386,367 | 5/1983 | Peterson et al. . |
| 4,400,719 | 8/1983 | Powers . |
| 4,435,728 | 3/1984 | Raven et al. . |
| 4,531,152 | 7/1985 | Lemelson et al. . |
| 4,551,753 | 11/1985 | Nishizawa et al. . |
| 4,620,225 | 10/1986 | Wendland et al. . |
| 4,635,114 | 1/1987 | Wendland et al. . |
| 4,641,188 | 2/1987 | Dischert . |
| 4,651,211 | 3/1987 | Weckenbrock et al. . |
| 4,652,909 | 3/1987 | Glenn . |
| 4,661,850 | 4/1987 | Strolle et al. . |
| 4,692,801 | 9/1987 | Ninomiya et al. . |
| 4,698,675 | 10/1987 | Casey . |
| 4,709,277 | 11/1987 | Ninomiya et al. . |
| 4,713,688 | 12/1987 | Guttner . |
| 4,733,299 | 3/1988 | Glenn . |
| 4,864,398 | 9/1989 | Avis et al. . |
| 4,897,716 | 1/1990 | Drewery et al. . |

(List continued on next page.)

FOREIGN PATENT DOCUMENTS

| | | |
|---|---|---|
| 0446894 | 9/1991 | European Pat. Off. . |
| WO94/30006 | 12/1994 | WIPO . |

OTHER PUBLICATIONS

"A Progress Report on Improved NTSC," Yves C. Faroudja and Joseph Roizen, *J. SMPTE*, Nov. 1989, pp. 817–822.

(List continued on next page.)

*Primary Examiner*—Nathan Flynn
*Assistant Examiner*—Vivek Srivastava
*Attorney, Agent, or Firm*—Gallagher & Lathrop; Thomas A. Gallagher

[57] ABSTRACT

Video sources from a progressively scanned camera are processed so as to simulate a video source derived from motion picture film. The simulated film source video creates a distinctive "pseudo-film pattern," in which at least some of every SDTV video field has no motion or low motion with respect to corresponding picture areas of the SDTV video field paired with it (occasional rare camera-originated scenes result in a field in which the entire picture has high motion, breaking the pseudo-film pattern). Corresponding picture areas within the pairs of fields having no motion or low motion are merged, in the manner in which interlaced fields derived from the same motion picture frame are merged. Corresponding picture areas within the pairs of fields having high motion are subject to interlace-to-progressive scan conversion processing which is not purely a merger of fields. The result, during a pseudo-film pattern, is a progressively-scanned picture tantamount to that produced by the progressively-scanned camera—no motion and low motion portions of the reproduced picture are very sharp and essentially identical to that of the original camera source, whereas high motion portions of the picture will have lower resolution, appearing slightly "fuzzy." The resulting psycho-visual impression is essentially identical to that of an HDTV system which stays progressive all the way from the source to the display, but at a fraction of the complexity and cost.

22 Claims, 8 Drawing Sheets

U.S. PATENT DOCUMENTS

| | | |
|---|---|---|
| 4,924,306 | 5/1990 | Van der Meer et al. . |
| 4,933,759 | 6/1990 | Van der Meer et al. . |
| 4,935,816 | 6/1990 | Faber . |
| 4,937,668 | 6/1990 | Hosaka . |
| 4,941,045 | 7/1990 | Birch . |
| 4,959,715 | 9/1990 | Prodan . |
| 4,967,271 | 10/1990 | Campbell et al. . |
| 4,979,020 | 12/1990 | Isnardi . |
| 4,985,767 | 1/1991 | Haghiri et al. . |
| 4,998,167 | 3/1991 | Jaqua . |
| 4,998,287 | 3/1991 | Katznelson et al. . |
| 5,012,326 | 4/1991 | Sakamoto et al. ............ 348/446 |
| 5,019,904 | 5/1991 | Campbell . |
| 5,023,713 | 6/1991 | Nishigori . |
| 5,043,810 | 8/1991 | Vreeswijk et al. . |
| 5,081,532 | 1/1992 | Rabii . |
| 5,115,311 | 5/1992 | Jaqua . |
| 5,128,747 | 7/1992 | Isnardi et al. . |
| 5,134,480 | 7/1992 | Wang et al. . |
| 5,136,380 | 8/1992 | Cho . |
| 5,138,449 | 8/1992 | Kerpchar . |
| 5,146,329 | 9/1992 | Flamm . |
| 5,153,719 | 10/1992 | Ibenthal . |
| 5,157,490 | 10/1992 | Kawai et al. . |
| 5,174,641 | 12/1992 | Lim . |
| 5,177,615 | 1/1993 | Ozaki . |
| 5,191,413 | 3/1993 | Edgar . |
| 5,191,427 | 3/1993 | Richards et al. . |
| 5,204,745 | 4/1993 | Kawai et al. . |
| 5,221,966 | 6/1993 | Clayton et al. . |
| 5,227,879 | 7/1993 | Morita et al. . |
| 5,235,417 | 8/1993 | Casavant et al. . |
| 5,255,091 | 10/1993 | Lyon et al. . |
| 5,267,035 | 11/1993 | Weckenbrock et al. . |
| 5,303,045 | 4/1994 | Richards et al. . |
| 5,315,327 | 5/1994 | Suzuki . |
| 5,317,398 | 5/1994 | Casavant et al. . |
| 5,329,309 | 7/1994 | Dorricott et al. ............ 348/446 |
| 5,329,317 | 7/1994 | Naimpally et al. . |
| 5,337,154 | 8/1994 | Dorricott et al. . |
| 5,353,119 | 10/1994 | Dorricott et al. ............ 348/446 |
| 5,365,273 | 11/1994 | Correa et al. . |
| 5,365,280 | 11/1994 | De Haan et al. . |
| 5,386,237 | 1/1995 | Knee . |
| 5,398,071 | 3/1995 | Gove et al. . |
| 5,406,333 | 4/1995 | Martin . |
| 5,428,399 | 6/1995 | Robinson et al. . |
| 5,430,488 | 7/1995 | Hedley . |
| 5,446,497 | 8/1995 | Keating et al. . |
| 5,452,011 | 9/1995 | Martin et al. . |
| 5,455,628 | 10/1995 | Bishop . |
| 5,461,420 | 10/1995 | Yonemitsu et al. . |
| 5,469,217 | 11/1995 | Ibental et al. . |
| 5,473,381 | 12/1995 | Lee . |
| 5,475,435 | 12/1995 | Yonemitsu et al. . |
| 5,485,216 | 1/1996 | Lee . |
| 5,485,280 | 1/1996 | Fujinami et al. . |
| 5,497,199 | 3/1996 | Asada et al. . |
| 5,502,489 | 3/1996 | Kim et al. . |
| 5,508,750 | 4/1996 | Hewlett et al. . |
| 5,517,247 | 5/1996 | Correa et al. . |
| 5,517,248 | 5/1996 | Isoda . |
| 5,534,935 | 7/1996 | Kawai et al. . |
| 5,550,592 | 8/1996 | Markandey et al. . |
| 5,563,651 | 10/1996 | Christopher et al. . |
| 5,563,660 | 10/1996 | Tsukagoshi . |
| 5,565,998 | 10/1996 | Coombs et al. . |
| 5,596,371 | 1/1997 | Pakhchyan et al. . |
| 5,606,373 | 2/1997 | Dopp et al. . |
| 5,610,662 | 3/1997 | Hackett . |
| 5,621,470 | 4/1997 | Sid-Ahmed . |
| 5,631,706 | 5/1997 | Tsunashima . |

OTHER PUBLICATIONS

"NTSC and Beyond," Yves Charles Faroudja, *IEEE Transactions on Consumer Electronics*, Feb. 1988, pp. 166–177.

"Improving NTSC to Achieve Near–RGB Performance," Yves Faroudja and Joseph Roizen, *J. SMPTE*, Aug. 1987, pp. 750–761.

"On Picture Quality of Some Television Signal Processing Techniques," Broder Wendland and Hartmut Schroeder, *J. SMPTE*, Oct. 1984, pp. 915–922.

"The Television Scanning Process," G.J. Tonge, *J. SMPTE*, Jul. 1984, pp. 657–666.

"Signal Processing for New HQTV Systems" by Broder Wendland and Hartmut Schroeder, *Television Image Quality*, 18th Annual SMPTE Television Conference in Montreal, Feb. 10–11, 1984, pp. 336–353.

"Psychophysics and the Improvement of Television Image Quality" by William F. Schreiber, *J. SMPTE*, Aug. 1984, pp. 717–725.

"Extended–Definition TV Fully Compatible with Existing Standards—Proposal and Experimental Results" by Takahiko Fukinuki, et al. *Television Image Quality*, pp. 354–368.

"Extended Definition Television with High Picture Quality" by Broder Wendland, *J. SMPTE*, Oct. 1983, pp. 57–71.

"High Quality Television by Signal Processing" by Broder Wendland, 2nd International Conference on New Systems and Services in Telecommunications, Liege, Belgium, Nov. 1983, pp. 401–409.

"Extended Definition Television with High Picture Quality" by Broder Wendland, *Video Pictures of the Future*, 17th Annual SMPTE Television Conference in San Francisco, Feb. 4–5, 1983, pp. 57–71.

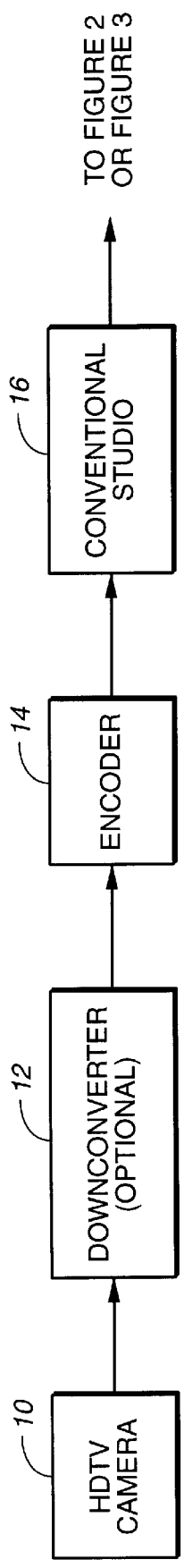
FIG._1
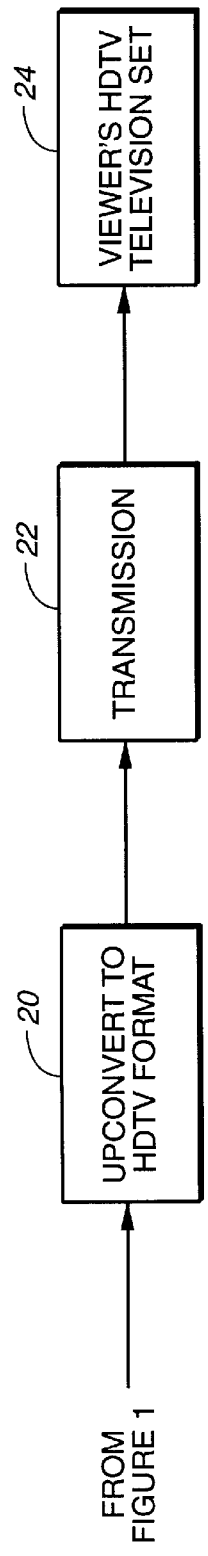
FIG._2
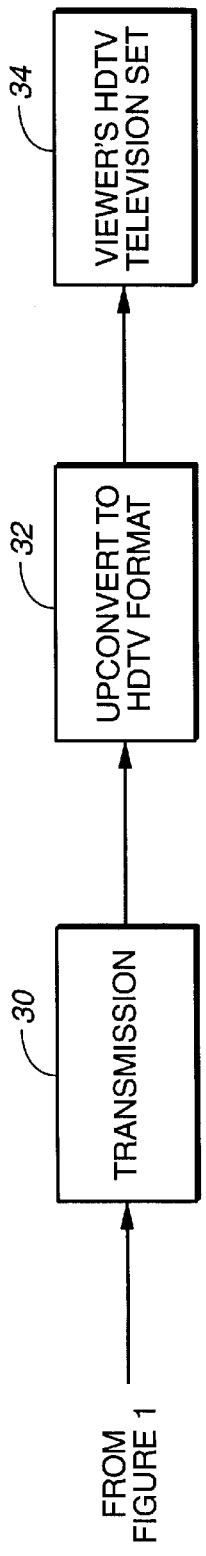
FIG._3

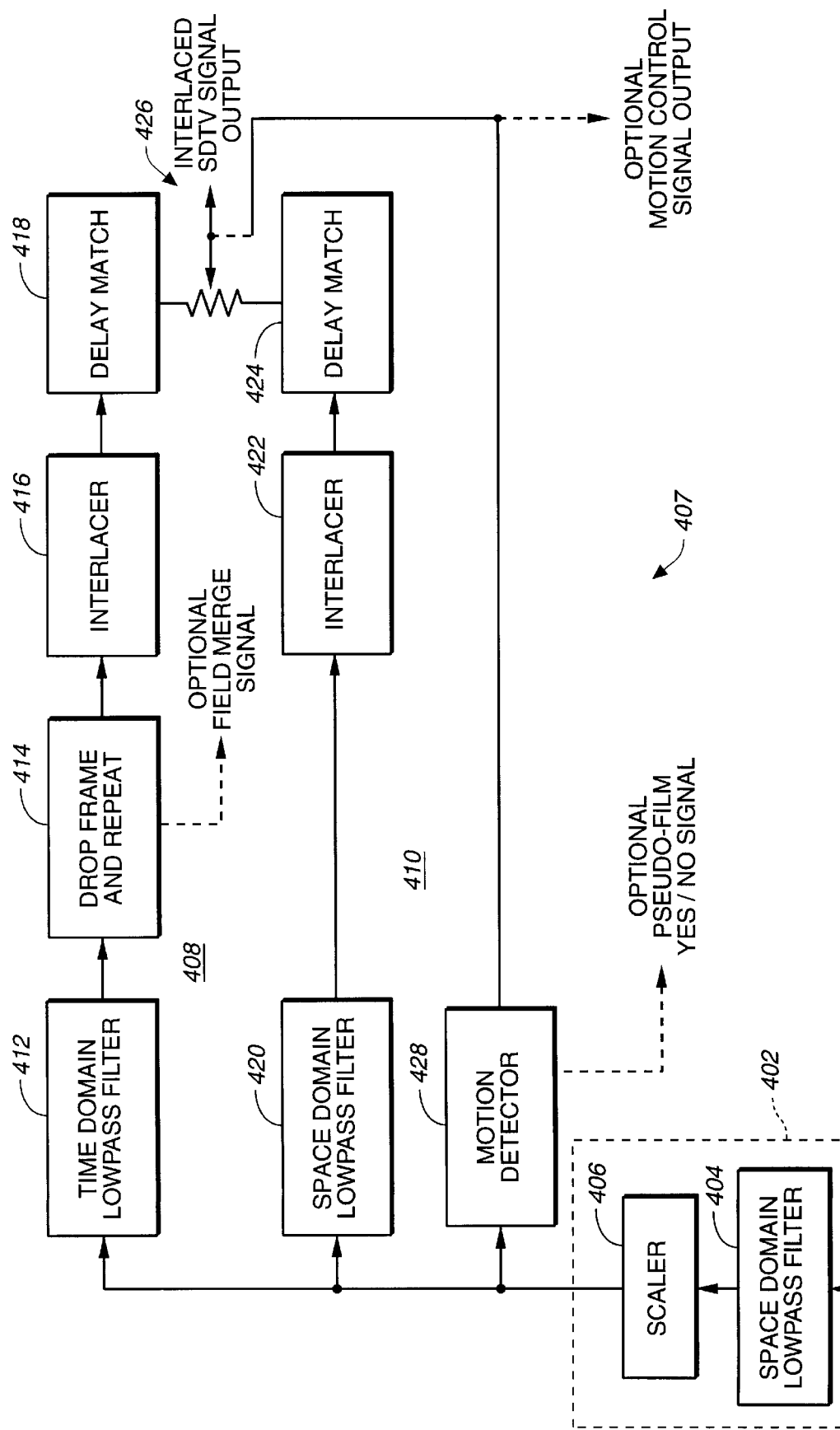
FIG._4

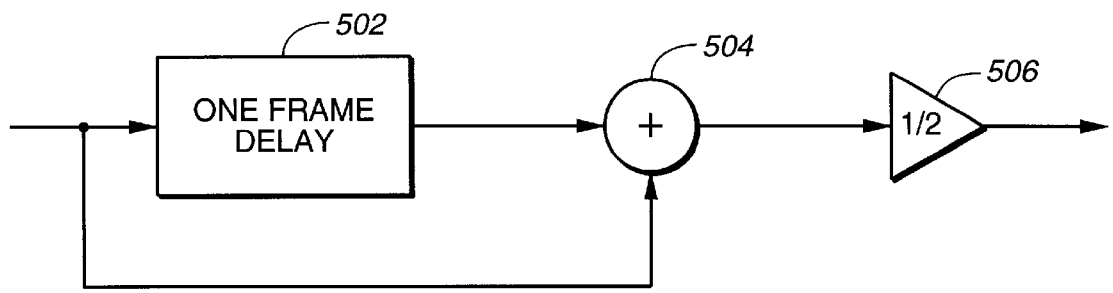
FIG._5
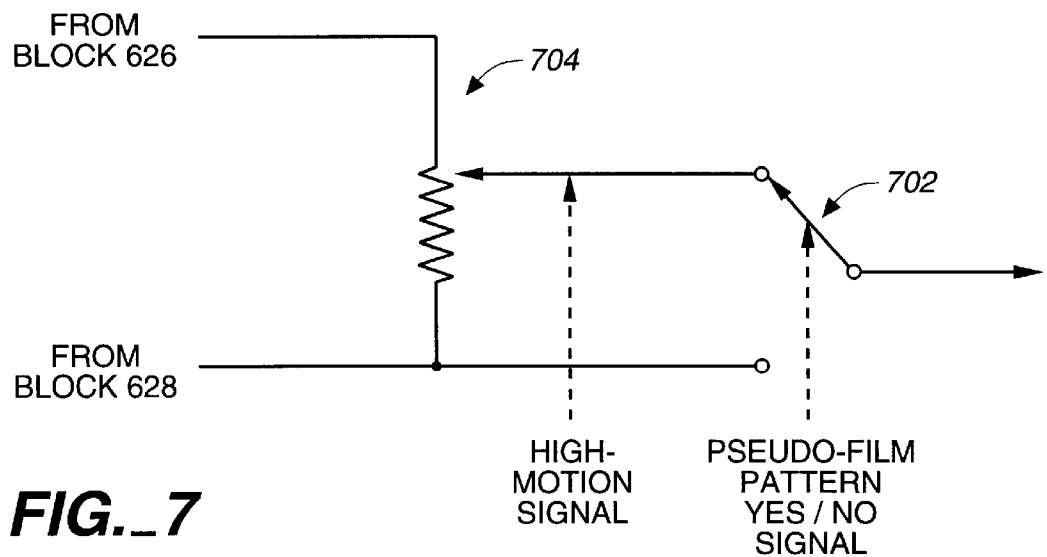
FIG._7
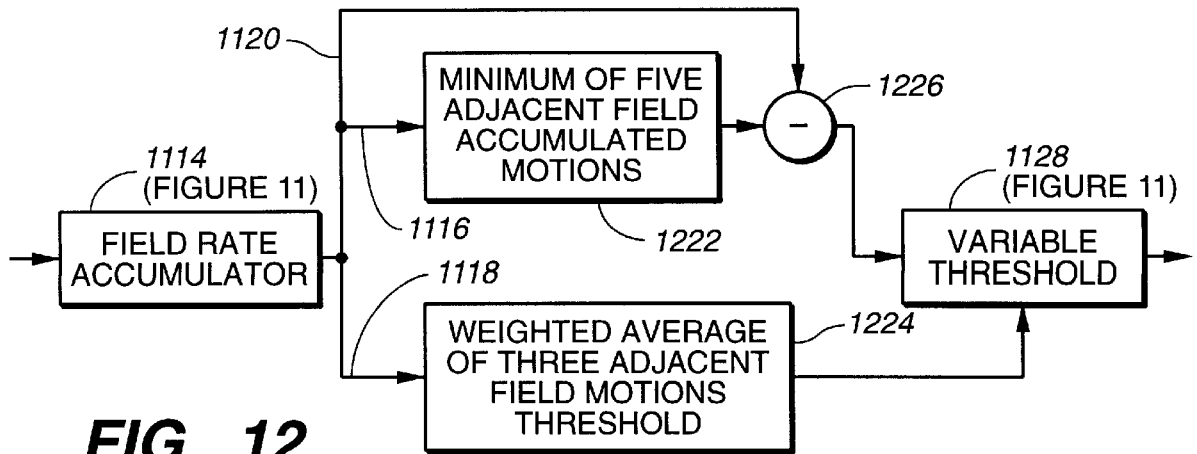
FIG._12

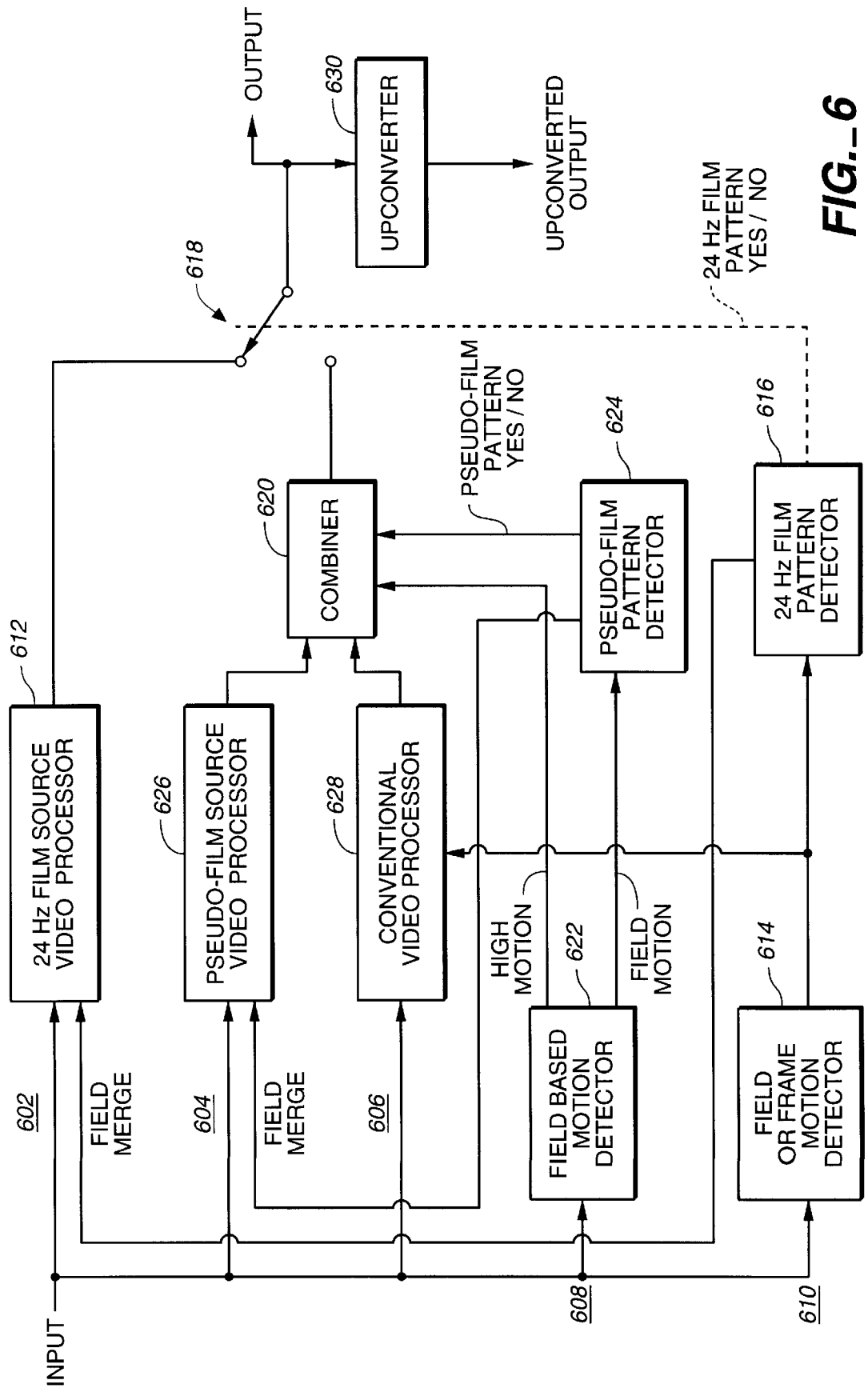
FIG._6

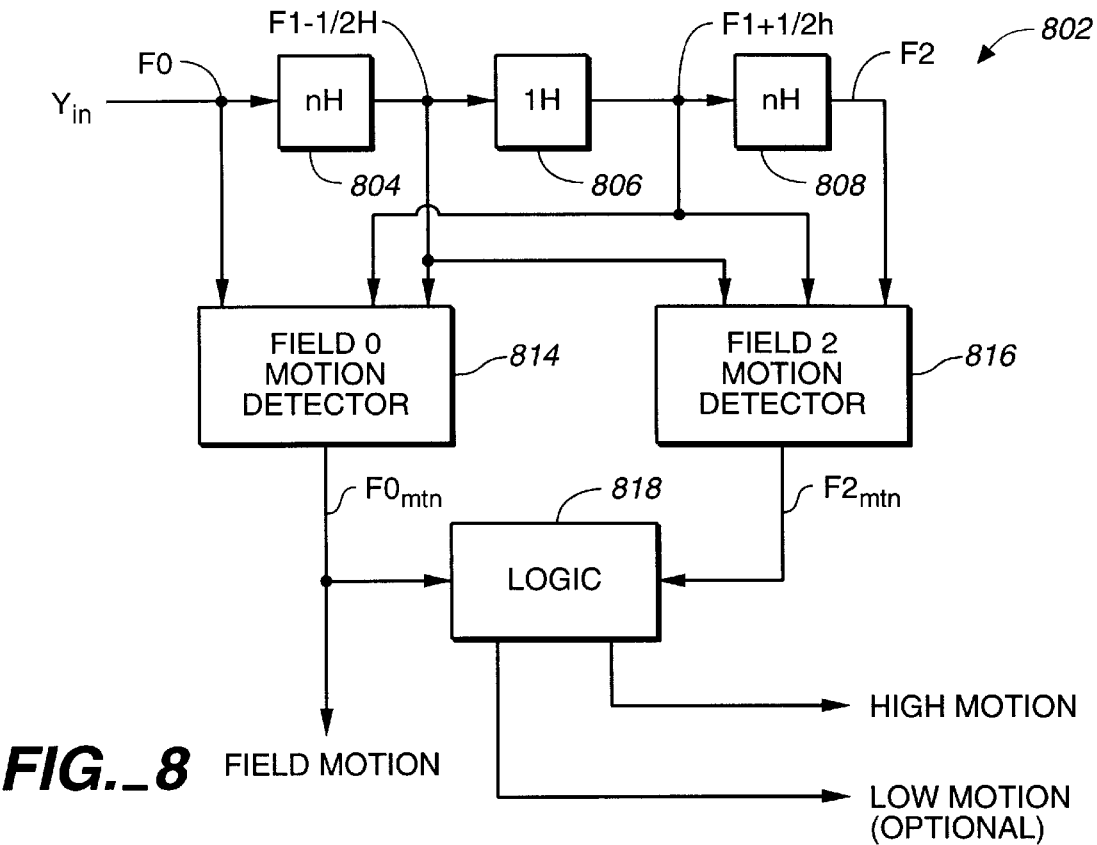
FIG._8
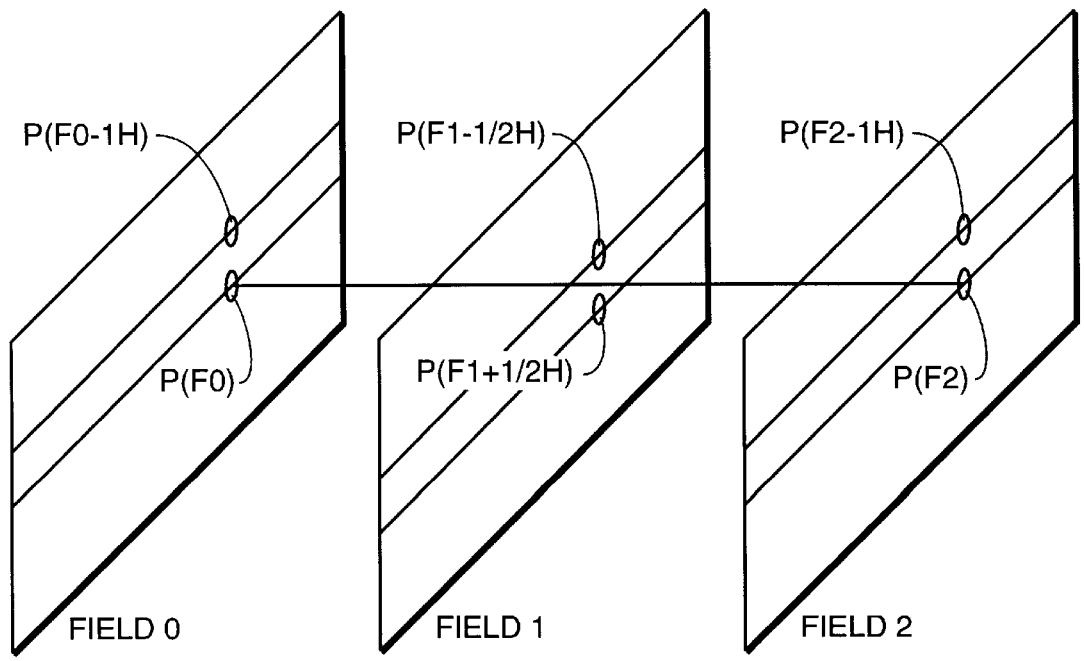
FIG._8A

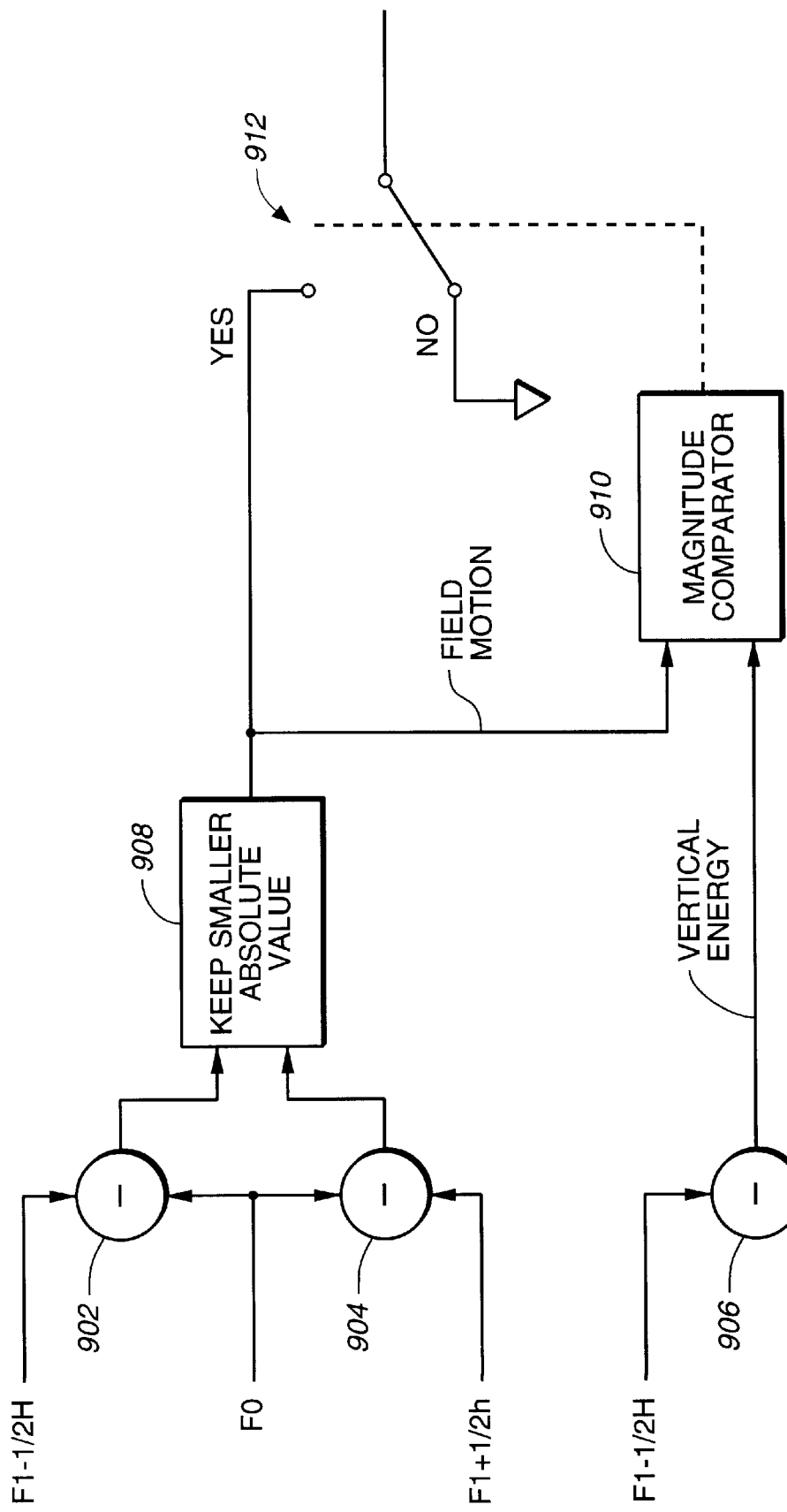
FIG._9

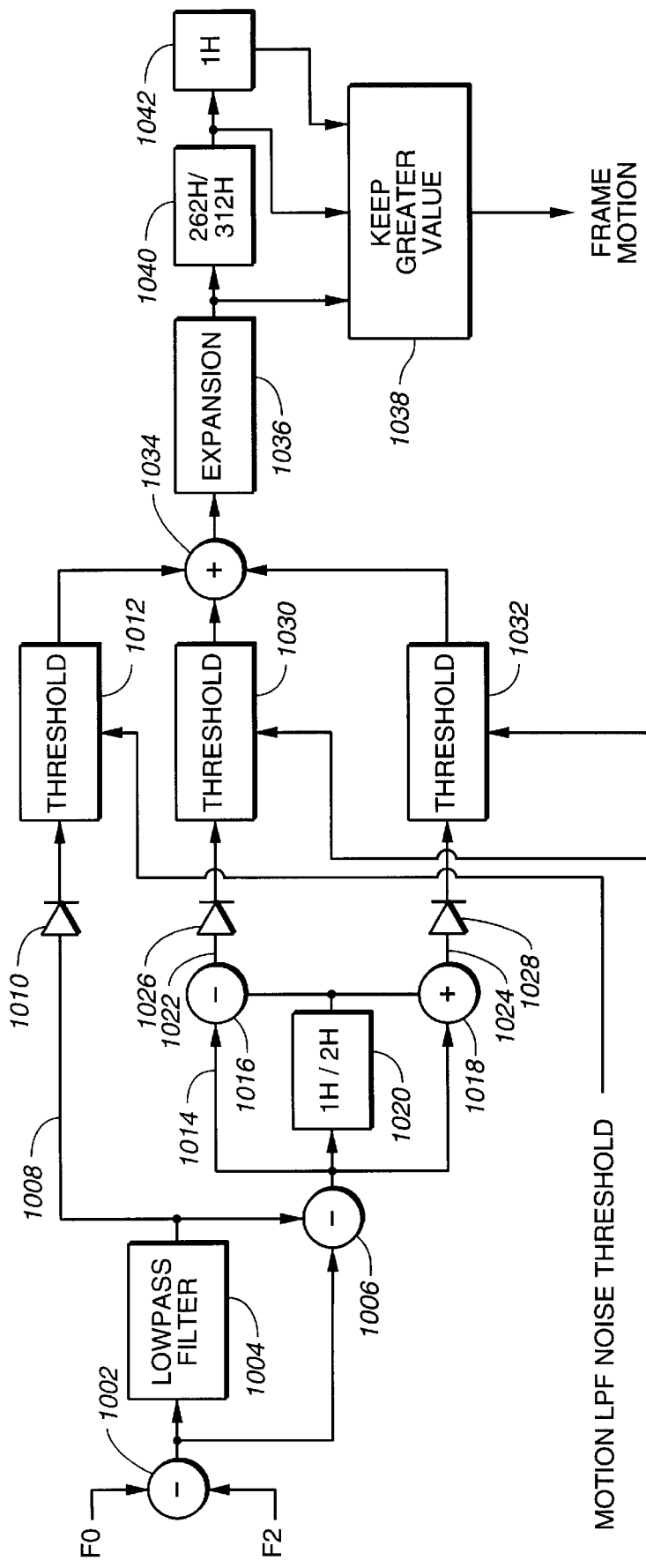
FIG._10

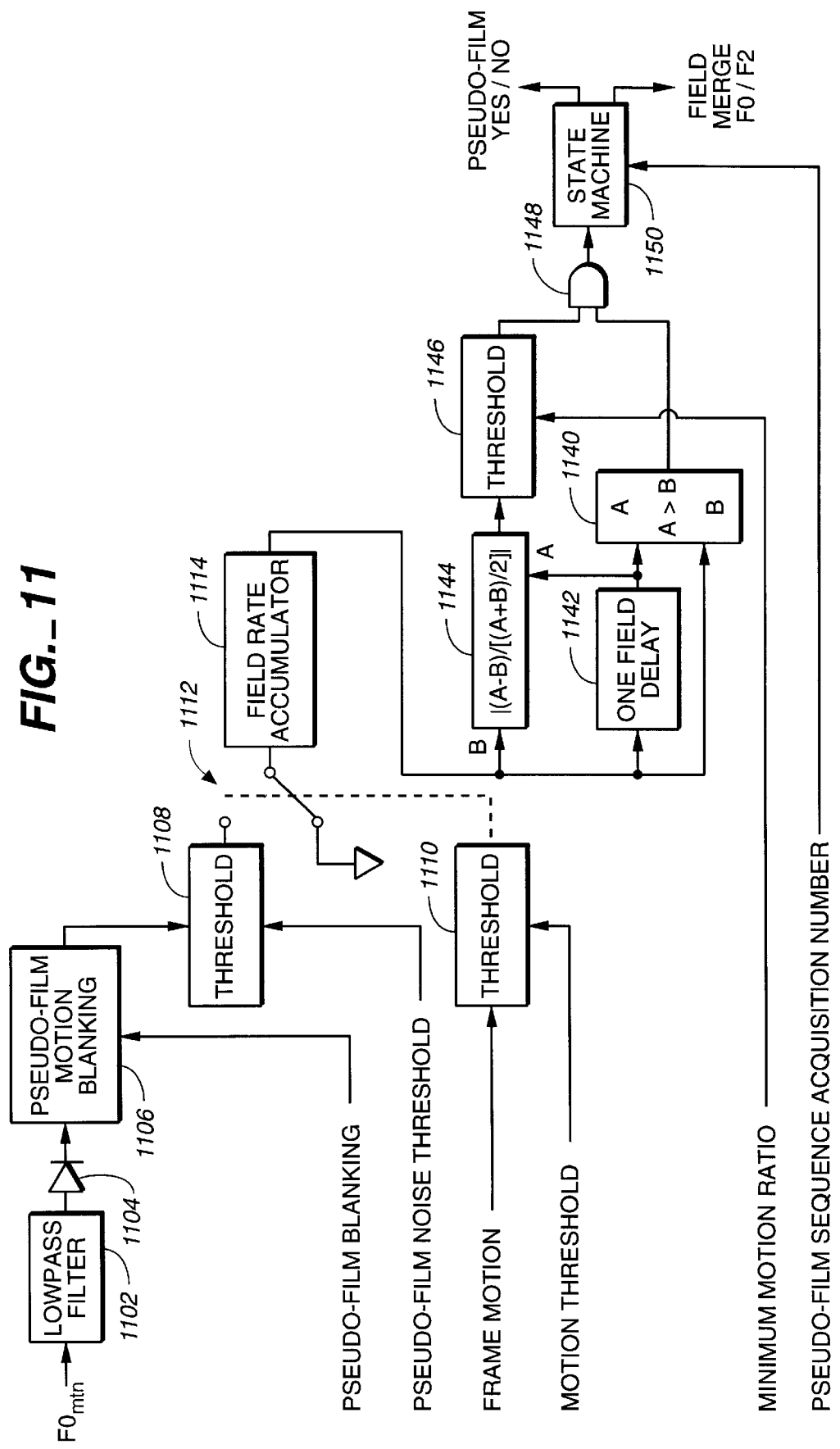
FIG._11

HIGH-DEFINITION TELEVISION SIGNAL PROCESSING FOR TRANSMITTING AND RECEIVING A TELEVISION SIGNAL IN A MANNER COMPATIBLE WITH THE PRESENT SYSTEM

FIELD OF THE INVENTION

The present invention relates to television signal processing. More particularly, the present invention relates to improved signal processing apparatus and methods for deriving a compatible standard-bandwidth television signal (a standard-definition television or "SDTV" signal) from a high-definition television ("HDTV") signal and for reconstituting a near high-definition television signal from the SDTV signal. The SDTV signal may be, for example, a standard analog or digitally encoded NTSC or PAL television signal or a digitally encoded television signal such as a CCIR 601 4:2:2 format video signal. The invention is particularly suitable for use with existing SDTV systems, including, for example television studio and production equipment and transmission systems, thus obviating the requirement to replace such existing equipment with expensive high-definition equipment.

CROSS REFERENCE TO RELATED APPLICATION

Portions of the present application are common to the copending application of Peter D. Swartz entitled "Film Source Video Detection," Attorneys' Docket YCF153, filed the same day as the present application.

DESCRIPTION OF RELATED ART

Many arrangements have been proposed for providing enhanced television reproduction while retaining standard analog NTSC or PAL signal transmission for compatibility with standard television receivers. Such arrangements have been described variously as IQTV (Improved Quality Television), HQTV (High Quality Television), IDTV (Improved Definition Television), EDTV (Extended Definition Television), and the like. Analogous problems and solutions have arisen with digitally encoded video signals. For example, the conversion of a CCIR 601 4:2:2 format to a data reduced form for transmission or storage by some downconversion and/or compression technique and the subsequent need to decode and restore the video signal in a way that approaches or exceeds the picture quality of the original format.

In the 1980's, one of the present inventors developed the SuperNTSC system in which high-definition reproduction was obtained from a compatible analog NTSC signal derived from a high quality progressively scanned source. The system is described, for example, in "Improving NTSC to Achieve Near-RGB Performance," Yves Faroudja and Joseph Roizen, *J. SMPTE*, August 1987, pp. 750–761; "NTSC and Beyond," Yves Charles Faroudja, *IEEE Transactions on Consumer Electronics*, February 1988, pp. 166–177; "A Progress Report on Improved NTSC," Yves C. Faroudja and Joseph Roizen, *J. SMPTE*, November 1989, pp. 817–822 and *System Description SuperNTSC*, Faroudja Research, Mar.15, 1990, Sections I, II and IV. For high resolution reproduction, SuperNTSC decoded the compatible composite NTSC signal into components, bandwidth expanded the chroma signal components in the horizontal domain, line doubled the signal components (i.e., doubled the number of lines in each interlaced field or, alternatively, converted the interlaced signal to progressive scan, the progressive scan frame rate corresponding to the interlaced scan field rate and each progressively scanned frame having twice as many scan lines as each interlaced field) and then spectrally expanded the luminance components in the horizontal domain prior to display on a high resolution monitor.

In "On Picture Quality of Some Television Signal Processing Techniques," Broder Wendland and Hartmut Schroeder, *J. SMPTE*, October 1984, pp. 915–922, the authors disclose a system (FIG. 1, line 3) in which a compatible 625 line, 2:1 interlaced television signal, derived from a high quality source, essentially free of aliasing artifacts, is converted from an interlaced to progressively scanned signal, interpolated to double the line frequency, and reconverted to an interlaced scan signal to provide a 1249 line, 2:1 interlaced television signal. Thus, the reproduced line rate and frame rate are each double that of the received compatible signal. A similar approach is described by in "The Television Scanning Process," G. J. Tonge, *J. SMPTE*, July 1984, pp. 657–666 and in other papers by Wendland or Wendland and another: "Extended Definition Television with High Picture Quality" by Broder Wendland, *Video Pictures of the Future*, A collection of papers presented during the 17th Annual SMPTE Television Conference in San Francisco, Feb. 4–5, 1983, pp. 57–71; and "High Definition Television Studies on Compatible Basis with Present Standards" by Broder Wendland, *Television Technology in the 80's*, A collection of papers on television production and post production technology, presented during the 15th Annual SMPTE Television Conference in San Francisco, Feb. 6–7, 1981, pp. 151–165. See also "Psychophysics and the Improvement of Television Image Quality" by William F. Schreiber, *J. SMPTE*, August 1984, pp 717–725.

In embodiments disclosed in one of the present inventor's U.S. Pat. Nos. 5,151,783, 5,159,451, 5,237,414 and 5,428,398, a standard-bandwidth television signal, such as an NTSC signal is applied to a motion-adaptive line doubler (doubling the number of lines in each interlaced field or, alternatively, converting the interlaced signal to progressive scan such that the progressive scan frame rate corresponds to the interlaced scan field rate and each progressively scanned frame has twice as many scan lines as in each interlaced field), the output of which is then applied to a non-linear enhancer, which includes bandwidth expansion for horizontal and/or vertical picture transitions.

Several additional papers and patents by Broder Wendland and Wendland and another relate to arrangements generally of the type mentioned above, but include a further element—the manner in which the televisions signals are processed depends on whether motion is present in the picture or whether the picture is substantially still. Aspects of such a two-mode system are set forth in: "High Quality Television by Signal Processing" by Broder Wendland, 2nd International Conference on New Systems and Services in Telecommunications, Liege, Belgium, November 1983, pp. 401–409; "Signal Processing for New HQTV Systems" by Broder Wendland and Hartmut Schroeder, *Television Image Quality*, A collection of papers on television technology presented during the 18th Annual SMPTE Television Conference in Montreal, Feb. 10–11, 1984, pp. 336–353; U.S. Pat. No. 4,620,225 (Wendland and Uhlenkamp) and U.S. Pat. No. 4,635,114 (Wendland and Schroeder).

Despite the substantial improvements resulting from the present inventor's SuperNTSC system and from arrangements such as proposed by Wendland or Wendland and another, and by others, the resulting television displays still fall short of HDTV displays produced by full widebandwidth HDTV transmission. Thus, there is a still unfulfilled need for a reproduction system capable of reconstructing a HDTV signal from a compatible video signal.

SUMMARY OF THE INVENTION

In accordance with the present invention, video sources from a progressively scanned camera are processed in a manner so as to simulate a video source derived from motion picture film for all but very rare camera-originated television scenes. The simulated film source video creates a distinctive pattern, referred to herein as a "pseudo-film pattern," in which at least some of every SDTV video field has no motion or low motion with respect to corresponding picture areas of the SDTV video field paired with it (occasional rare camera-originated scenes result in a field in which the entire picture has high motion, breaking the pseudo-film pattern). Corresponding picture areas within the pairs of fields having no motion or low motion are merged, in the manner in which interlaced fields derived from the same motion picture frame are merged. Corresponding picture areas within the pairs of fields having high motion are subject to interlace-to-progressive scan conversion processing which is not purely a merger of fields. The result, during a pseudo-film pattern, is a progressively-scanned picture tantamount to that produced by the progressively-scanned camera—no motion and low motion portions of the reproduced picture are very sharp and essentially identical to that of the original camera source, whereas high motion portions of the picture will have lower resolution, appearing slightly "fuzzy." However, loss of resolution in moving picture areas occurs even in the original camera source and is virtual unseen by the human eye. The resulting psychovisual impression is essentially identical to that of an HDTV system which stays progressive all the way from the source to the display, but at a fraction of the complexity and cost. During rare breaks in the pseudo-film pattern, conventional interlace-to-progressive scan conversion still provides a high quality picture, providing an excellent failure mode.

The present invention has several aspects—1) an origination or encoding portion which receives as its input, preferably, a progressively-scanned (or, alternatively and less desirably, an interlaced) television signal from an HDTV camera and provides as its output an interlaced SDTV television signal, 2) a receiving or decoding portion, which receives as its input an interlaced SDTV signal and, in its preferred embodiment, provides as its output a high-definition format progressively-scanned (or, alternatively, interlaced) television signal, and 3) a system in which the encoding and decoding portions operate together so that the high-definition format television signal provided by the decoding portion is essentially identical to that of the signal provided to the encoding portion by the HDTV camera. Although the encoding portion may be used without the decoding portion in order to provide a very high quality NTSC, PAL or other SDTV signal and the decoding portion may be used without the encoding portion in order to provide an improved high-definition-like television signal, the encoding portion and decoding portion are advantageously used together in a system to achieve the highest resulting television signal quality.

In the encoder portion of the invention, an interlaced SDTV signal is derived from a progressively-scanned television signal, the SDTV signal having substantially the number of active picture scanning lines in a frame (i.e., two interlaced fields) as the progressively-scanned television signal has in a progressive scan frame, and the SDTV signal having an interlaced field rate substantially the same as the frame rate of the progressively-scanned television signal. The encoder accomplishes derivation of the SDTV signal as follows:

in what may be characterized as a low-motion process, a first intermediate interlaced television signal is provided, the signal is time-domain lowpass filtered and has a field rate substantially the same as the progressive scan frame rate, but changes in the television signal active picture information do not exceed the interlaced television signal frame rate, thus, each successive pair of interlaced fields has identical motion content (as fields do which are derived from motion picture film sources), in what may be characterized as a high-motion process, a second intermediate interlaced television signal is provided, the signal has a field rate substantially the same as the progressive scan frame rate, while changes in the interlaced television signal active picture information may exceed the interlaced television signal frame rate they may not exceed the interlaced television signal field rate, a motion control signal is derived from differences in picture information from frame to frame of said progressively-scanned television signal, indicating the degree of motion in the progressively-scanned television signal, and the first intermediate interlaced television signal and the second intermediate interlaced television signal are selected in response to the motion control signal such that, in accordance with the degree of motion indicated by the motion signal, one of the two intermediate interlaced television signals is selected or a mixture of the intermediate interlaced television signals is selected, to produce an interlaced SDTV signal.

Selection of the intermediate interlaced television signals from the low-motion process and the high-motion process operates on a real-time (i.e., intraframe) basis with a preference for the intermediate signal provided by the low-motion process such that the default condition is to provide the intermediate interlaced signal from the low-motion process, the output providing some degree of signal from the high-motion process only when high motion occurs. Thus, the SDTV signal has a pattern similar to the pattern which would be produced if the television source were a motion picture film having a frame rate the same as the interlaced television signal's frame rate (i.e., in the case of a film source each pair of interlaced fields are derived from the same motion picture film frame). Here, however, the pairs of interlaced fields may be derived from the same progressively scanned frame only part of the time: they are derived from the same progressive frame for those portions having low motion, but they are not derived from the same progressive frame for those portions of a field having high motion. Thus, the interlaced field pattern generated by the encoder of the present invention produces what is defined herein as a "pseudo-film pattern." Such a pattern resembles a true film pattern with the exception that there may be one or more high motion "holes" within a field. The pseudo-film pattern may be broken by one or more fields which are totally high motion resulting from, for example, the HDTV source camera rapidly panning a wholly still scene.

The generation and detection of film patterns in video signals are well known in the art. See, for example, U.S. Pat. Nos. 4,876,596; 4,982,280; and 5,291,280 and Published International Patent Application WO 94/30006. As explained below, modifications of such film pattern detection techniques allow the detection of a pseudo-film pattern.

In the decoder portion of the invention, a progressively-scanned television signal is derived from an interlaced SDTV signal. The decoder accomplishes derivation of the interlaced SDTV signal as follows:

a high motion control signal based on field-to-field differences in the interlaced SDTV signal is provided, the high motion control signal indicating the degree of motion in the SDTV interlaced television signal, a pattern YES/NO signal is provided, where YES indicates the detection of a pseudo-film pattern and NO indicates the non-detection of a pseudo-film pattern in the interlaced SDTV signal, a field merge signal is provided, the field merge signal indicating, when the pattern YES/NO signal is in its YES condition, which pairs of interlaced fields are derived from the same pseudo-film frame, in what might be characterized as a low-motion process, a first intermediate progressively-scanned television signal is provided, the signal being made up of two identical progressively-scanned television signal frames from each pair of interlaced fields identified by the field merge signal as pairs in the interlaced SDTV signal, in what might be characterized as a high-motion process, a second intermediate progressively-scanned television signal is provided in which each frame is derived from one or more fields of the interlaced SDTV signal, the progressively-scanned television signal having a frame rate the same as the field rate of the interlaced SDTV signal, and the first intermediate progressively-scanned television signal and the second intermediate progressively-scanned television signal are selected in response to the high motion control signal and the pattern YES/NO signal such that, when the pattern YES/NO signal is in its YES condition, in accordance with the degree of motion indicated by the motion signal, one of the two intermediate progressively-scanned television signals is selected or a mixture of the intermediate progressively-scanned television signals is selected, the resulting signal having a varying motion resolution, or, when the pattern YES/NO signal is in its NO condition, the output of the second intermediate progressively-scanned television signal is selected, to produce the progressively-scanned television signal.

BRIEF DESCRIPTION OF THE DRAWINGS

FIG. 1 is a functional block diagram showing an environment for a first portion of a system employing the encoding and decoding aspects of the invention.

FIGS. 2 and 3 are functional block diagrams showing an environment for alternative second portions of a system employing the encoding and decoding aspects of the invention.

FIG. 4 is a functional block diagram showing an embodiment of the encoder of the present invention being fed by an HDTV camera and an optional downconverter.

FIG. 5 is a functional block diagram showing a time-domain lowpass filter usable in the encoder of FIG. 4.

FIG. 6 is a functional block diagram of a decoder according to a preferred embodiment of the invention.

FIG. 7 is a partly schematic diagram showing the details of the combiner of FIG. 6.

FIG. 8 is a functional block diagram showing the details of a preferred field-based motion detector arrangement for use in the decoder of FIG. 6.

FIG. 8A is a quasi-three-dimensional representation of three consecutive interlaced-scan television fields, showing relative pixel locations within the respective fields.

FIG. 9 is a functional block diagram showing a preferred field-based motion detector for use in the arrangement of FIG. 8.

FIG. 10 is a functional block diagram showing a preferred frame motion detector for use in the decoder of FIG. 6.

FIG. 11 is a functional block diagram showing details of the pseudo-film pattern detector of the decoder of FIG. 6.

FIG. 12 is a functional block diagram showing an alternative arrangement for a portion of the pseudo-film detector of FIG. 11.

INCORPORATION BY REFERENCE

Each of the following U.S. patents are hereby incorporated by reference in their entirety: U.S. Pat. Nos. 4,620,225; 4,635,114; 4,876,596; 4,967,271; 4,982,280; 4,989,090; 5,151,783; 5,159,451; 5,237,414; 5,291,280; 5,428,398; 5,488,422; and 5,625,421.

DESCRIPTION OF THE PREFERRED EMBODIMENTS

Except as noted herein, practical embodiments of the invention may be implemented using analog, digital (including digital signal processing with software), or hybrid analog/digital techniques. The equivalency of analog and digital implementations in most contexts is well known to those of ordinary skill in the art.

Throughout this document, for simplicity, signal inputs and outputs are drawn as single points and signal carrying lines are drawn as single lines. It will be understood that, in practice, more than one input or output point and more than one signal carrying line may be required, depending on the format of the signals and the manner in which the practical embodiments of the invention are physically constructed.

Useful environments for the various aspects of the present invention are shown in FIGS. 1–3.

FIG. 1 shows an environment for a first portion of a system employing the encoding and decoding aspects of the invention. In FIG. 1, an HDTV (high-definition television) camera 10 provides a video source signal. The camera output is applied to an optional downconverter 12. Either the camera output itself, if in a suitable format, or the downconverter is applied to an encoder 14 according to the present invention. It is desired that the output of the downconverter or the output of the HDTV camera provide a progressively-scanned television signal having substantially the number of active picture scanning lines in a frame as the interlaced SDTV signal provided by the encoder 14 has in a frame (i.e., a frame made up of two interlaced fields) and having a progressive scan frame rate substantially the same as the interlaced field rate of the SDTV signal provided by the encoder. As may be necessary, any differences in aspect ratio may be handled by an appropriate scaler which may be part of the optional downconverter.

Thus, for example, if the desired output of encoder 14 is an NTSC television signal having 525 lines (nominally 480 active picture lines), 2–1 interlaced, a nominal 60 Hz field rate (as is well known, the actual NTSC color frame rate is 59.94 Hz, however, it will be referred to as 60 Hz in this document and likewise, the 29.97 Hz field rate will be referred to as 30 Hz), and a nominal 30 Hz frame rate, the input to the encoder should be a non-interlaced progressive scan television signal having a nominal 60 Hz frame rate and 480 active picture lines. If the HDTV camera has a higher number of active picture lines, has a higher frame rate and/or provides an interlaced video output, the optional downconverter 12 is employed. Downconverter 12 should satisfy the Nyquist criteria in all three dimensions (horizontal, vertical and temporal) in order to minimize artifacts in the ultimately reproduced television picture.

The input signal may be a monochrome video signal or the luminance components of a component color video signal. Those of ordinary skill in the art will understand that a component video signal may comprise analog or digital components such as RGB (from which luminance and chrominance components may be derived), Y/I/Q, Y/U/V, Y/R-Y/B-Y, Y/Cr/Cb, etc. Furthermore, in the case of digital components, the received digital component video signal may be in any of a number of compressed or uncompressed formats, including, for example, various ones of the digital component video formats in accordance with the recommendations, standards or compression algorithms of the CCIR (International Radio Consultative Committee) (such as the hierarchy of digital video coding formats under CCIR Recommendation 601, the 4:2:2 format often being referred to as a CCIR 601 video signal), ISO/MPEG (the Motion Picture Experts Group of the International Standards Organization), SMPTE (Society of Motion Picture and Television Engineers), EBU (European Broadcasting Union), and/or the recommendations or standards of other industry, governmental or quasi-governmental bodies.

The output of the encoder 14 is then employed by a conventional television "studio" 16 which operates in accordance with the interlaced SDTV signal provided by the encoder. The studio 16 may include, for example, television production, recording and/or editing facilities. In addition to receiving video inputs from an HDTV camera processed by the encoder of the present invention, the studio 16 may also receive interlaced SDTV signals from video sources and motion picture film sources not processed by an encoder of the present invention.

The output of the conventional studio 16 in the FIG. 1 arrangement may be used to provide an interlaced SDTV signal to be used in a conventional way as, for example, for standard NTSC transmission or recording. However, the output of the conventional studio may advantageously be employed as part of a system employing a decoder according to the present invention. FIGS. 2 and 3 show alternative environments for completing such a system.

In FIG. 2, the interlaced SDTV signal output of the conventional studio 16 is upconverted to any desired HDTV format in block 20 and the signal is then applied to a transmission block 22. The transmission block may include wired and/or wireless transmission and/or recording. The transmission output is then applied to a viewer's HDTV television set 24, operating in accordance with the HDTV format of block 20. Upconverter 20 includes a decoder according to the present invention.

Alternatively, as shown in FIG. 3, the output of the conventional studio 16 is applied to a transmission block 30. The transmission block may include both wired and/or wireless transmission and/or recording. The transmission output is then applied to an upconverter 32 which upconverts the compatible standard-bandwidth television signal to any desired HDTV format in block 32. The HDTV signal is then applied to a viewer's HDTV television set 34, operating in accordance with the HDTV format of block 32.

Thus, in the arrangement of FIG. 2, the transmission block carries an HDTV signal whereas in the arrangement of FIG. 3, the transmission block carries an interlaced SDTV signal.

FIG. 4, a functional block diagram, shows an embodiment of the encoder of the present invention being fed by an HDTV camera and an optional downconverter. The output of an HDTV camera (not shown) is applied to the optional downconverter 402. The downconverter 402 may include a space-domain lowpass filter (typically, a vertical-domain lowpass filter) 404 and a scaler 406. As explained above, in connection with FIG. 1, the camera output or the downconverter output, if a downconverter is required, is applied to the encoder, shown here as the remaining portion 407 of FIG. 4. In either case, it is desired to provide as the input to the encoder a progressively-scanned television signal essentially free of visible aliasing in the time domain and in the vertical domain. Such techniques and requirements are well known in the prior art. See, for example, the Wendland and Tonge references cited above.

The substantially alias-free progressively-scanned television signal is applied to three paths—two signal processing paths and a control signal generating path. The upper signal processing path 408 is a low-motion signal processor providing a first intermediate interlaced television signal having low motion content. The lower signal processing path 410 is a high-motion signal processor providing a second intermediate interlaced television signal having high motion content.

It should be understood that while the function of the encoder is explained by reference to several paths, practical embodiments providing substantially the same functions and results may be implemented in other ways, for example, ways in which the signal processing paths are wholly or partially integrated into a single path.

The low-motion signal processor in path 408 includes a time-domain lowpass filter 412. In its simplest and preferred embodiment, shown in FIG. 5, this temporal filter averages two successive frames. The input is applied to a one-frame delay 502 and to a summing node 504 which also receives the one-frame delayed output of the input signal. The output of the summing node 504 is then scaled in amplitude by one-half in scaler 506. Alternatively, four successive frames may be averaged. For conditions of low motion, two successive progressively-scanned frames are not too far from each other—they are very smoothly related. Preferably, filter 412 has a threshold such that it does not operate on signals below a certain amplitude level, for example, a level commensurate with the noise level.

Returning to FIG. 4, the purpose of the temporal filter 412 is to provide greater adherence to the Nyquist criterion in the time domain. In the absence of such a filter, which is absent in the aforementioned U.S. Pat. No. 4,620,225, temporal aliasing artifacts are visible for some camera conditions. For example, without such a filter, the slow panning of a scene may cause a visible "juddering" effect. Another purpose for temporal filter is to provide a good balance between the signal processing timings of the paths 408 and 410. The output of the temporal filter 412 remains a progressively-scanned television signal with the same frame rate and number of active picture lines as the input signal. This provides the same sharp image for still or slow moving objects as does the input signal to the time-domain lowpass filter.

In order for the low-motion process of path 408 to provide a reasonable picture content alignment with the fields produced by the high-motion process of path 410, the temporal filter 412 must process an even number of frames (i.e., 2, 4, etc.). In practice, a two frame averaging is preferred, although averaging over four frames is practical although at greater cost and complexity. The temporal lowpass filter 412 may also be adaptive such that it varies the number of frames over which it averages in response to the content of one or more frames.

The output of the temporal filter 412 is applied to a drop-frame-and-repeat function 414 which eliminates every other progressively-scanned frame and repeats every non-eliminated frame thereby providing pairs of processed identical progressively-scanned television signal frames having the same frame rate as the progressively-scanned television signal received by time-domain lowpass filter 412 but having a motion resolution of one-half its progressive scan frame rate. Thus, the signal at the output of block 414 is equivalent to that which would result if the source were a film source having a frame rate half of the frame rate of the progressively-scanned signal—every two successive frames are identical (e.g., a 30 frame/second motion picture film in a 60 Hz NTSC system or a 25 frame/second motion picture film in a 50 Hz PAL system).

Optionally, block 414 provides a field merge signal indicating which pairs of frames are identical. Such a marker signal is usable in the decoder to identify which pair of fields of the interlaced signal received at the decoder should be merged to reconstruct the progressively-scanned signal. Alternatively, by convention, if the encoder always generates an interlaced frame in which the fields are derived from the same progressively-scanned frames, then the decoder could be simplified and there would be no need to transmit a marker signal (the decoder would simply employ well-known techniques to identify the even and odd parity fields making up each interlaced frame). However, as will be explained below, the decoder is capable, albeit with greater complexity, of determining which pair of fields should be merged without receipt of a marker signal or the adoption of such a convention.

The output of the drop-frame-and-repeat process 414 is applied to an interlacer 416 providing an interlaced television signal having substantially the number of active picture scanning lines in a frame (i.e., two interlaced fields) as the processed progressively-scanned television signal has in a frame and having an interlaced field rate substantially the same as the frame rate of the processed progressively-scanned television signal. Preferably, the interlacer creates the two opposite parity fields of each interlaced frame (or, alternatively, the two successive opposite parity fields from different interlaced frames) from each pair of identical progressively-scanned frames, dropping every other line in the pairs of identical progressively-scanned frames, the dropped lines being offset by one line from frame to frame. Such interlacers are known in the prior art in connection with converting motion picture film to video (i.e., the telecine art). The motion content or motion resolution of the resulting interlaced signal is at the interlaced frame rate rather than the field rate because each pair of fields is derived from a pair of identical progressively-scanned frames.

The interlacer 416 output is applied to a delay match 418 which provides any time delay necessary to synchronize the timing of the signal outputs from paths 408 and 410.

The high-motion signal processor in path 410 includes a space-domain lowpass filter 420. In its simplest and preferred embodiment, the space-domain filter provides vertical-domain filtering by taking a weighted average of five successive horizontal lines, although this is not critical. Such filters are well known in the art. As is also well known, the purpose of such a filter is to suppress a type of aliasing, the perceived flickering caused of single horizontal lines when they are moving vertically or the horizontal edges of objects when they are moving vertically. The space-domain lowpass filter may also include a horizontal lowpass filter in order to further reduce aliasing artifacts caused by horizontal motion. Such filters and their purpose are also well known in the art. Preferably, filter 420 has a threshold such that it does not operate on signals below a certain amplitude level, for example, a level commensurate with the noise level.

The space-domain lowpass filter 420 is applied to an interlacer 422 providing an interlaced television signal having substantially the number of active picture scanning lines in a frame (i.e., two interlaced fields) as the space-domain lowpass filtered progressively-scanned television signal has in a frame and having an interlace field rate substantially the same as the frame rate of the space-domain lowpass filtered progressively-scanned television signal. Preferably, interlacer 422 creates the two opposite parity fields of each interlaced frame from consecutive pairs of space-domain lowpass filtered progressively-scanned frames, wherein the interlacer drops every other line in the progressively-scanned frames to create each field, the dropped lines being offset by one line from frame to frame. Unlike in interlacer 416 in the low-motion path, the consecutive pairs of progressively-scanned frames, from which the pairs of interlaced fields are derived by interlacer 422, are not always identical. The motion content or motion resolution of the resulting interlaced signal is at the interlaced field rate because each field in a pair is derived from a different progressively-scanned frame. Interlacers such as interlacer 422 are known in the art.

The interlacer 422 output is applied to a delay match 424 which provides any time delay necessary to synchronize the timing of the signal outputs from paths 408 and 410.

The outputs of the respective processor paths 408 and 410 are applied to inputs of a type of switch 426, often referred to as a fader or soft switch, shown schematically as a potentiometer, the output of which, the interlaced SDTV signal output, is taken from the adjustable tap. The position of the tap, and therefore the degree to which the output of one path or another or some mixture of the two is taken as the encoder output, is controlled by a motion control signal produced by a motion control generator 428. The motion control signal is derived from differences in picture information from frame to frame of the progressively-scanned television signal input (the progressive scan frame rate being the same as the interlace scan field rate), the differences indicating the degree of motion in the progressively-scanned television signal (and consequently, in the resulting interlaced SDTV signal produced by the encoder). As the tap position is varied, the motion resolution of the resulting output signal varies.

In practice, the switch 426 may be implemented in any of various ways (electronically or by software, for example) which allow its rapid control such that changes in path selection within a field of the output interlaced signal are readily accomplished in real time.

Many motion control generators suitable for use as motion control generator 428 are known in the prior art. Preferably, the motion control generator detects differences between progressively-scanned frames on a pixel-by-pixel basis and generates a motion control signal responsive to differences in blocks of pixels from frame to frame in the input progressively-scanned signal. Preferably, the motion control generator is responsive to the velocity, size and amplitude of the picture movement. In addition, it is also preferred that the motion control generator is able to detect panning, where the entire picture (the entire frame) may be said to be moving.

The motion control signal may cause the switch to transition between the low-motion and high-motion mode outputs of paths 408 and 410 many times within each field, the extent to which one path or the other is selected depending on the degree of motion (based on a weighting of size, velocity and amplitude) throughout the picture. The motion control signal should select the low motion path output when motion in the displayed picture would appear to the eye as smooth and continuous when displayed with the motion resolution produced by the low motion path; otherwise, it should select the high motion path output. For nearly all scenes generated by the HDTV camera source, the switch will select the low-motion mode for at least a portion of each field (the entire field for the case of a still scene). In the very rare case of the HDTV camera source rapidly panning a still scene (for example, panning across the side of a mountain at a high motion rate (i.e., a rate greater than 30 Hz for NTSC), the switch would select the high-motion mode during the entire field. On the other hand, a pan of a running player in a football game (the camera tracking the runner) would result in selection of the low-motion mode for the relatively stationary portions of the runner's body (e.g., all but the legs and perhaps arms) and the high-motion mode for the rest of the picture. The motion control signal default condition is such as to cause the switch 426 to select only the low-motion output of path 408. Thus, for nearly all fields, at least a portion of each field is produced by the low-motion path, creating the pseudo-film pattern for all but relatively rare cases such as rapid panning across a still scene. The motion control generator 428 may also generate an optional pseudo-film YES/NO signal, the signal being in its YES condition for all conditions except when the entire field is in the high-motion mode.

Thus, for nearly all signal conditions, the output signal from switch 426 is an interlaced signal having a baseline motion resolution at its frame rate, but in which high-motion "holes" occur within fields. Rarely, as just discussed above, entire fields have field rate motion, causing a break in the pseudo-film pattern. The result for most signal conditions is pairs of interlaced fields which are derived at least in part from the same progressively-scanned frame: they are from the same progressively-scanned frame for those portions in which the field is produced by the low-motion process. Such an interlaced field pattern generated by the encoder of the present invention is defined herein as a "pseudo-film pattern."

DECODER DESCRIPTION

FIG. 6 shows a functional block diagram of a decoder according to a preferred embodiment of the invention. The decoder forms a portion of the "Upconvert to HDTV Format" block 20 of the FIG. 2 arrangement or the "Upconvert to HDTV Format" block 32 of the FIG. 3 arrangement. The input of the FIG. 6 decoder is the input to block 20 (FIG. 2) or block 32 (FIG. 3), namely a interlaced SDTV signal. The output of the FIG. 6 decoder, a reconstructed progressive scan television signal, has substantially the number of active picture scanning lines in a frame as the interlaced SDTV signal has in a frame (i.e., two interlaced fields) and has a progressive scan frame rate substantially the same as the interlace field rate of the interlaced television signal. If necessary to accommodate the format of the viewer's HDTV television set (block 24, FIG. 2; block 34, FIG. 3), the encoder output is further upconverted, for example, by increasing the number of progressive scan lines or frames and/or changing the aspect ratio. Such further upconversion may be accomplished by any of various known techniques.

The input to the decoder of FIG. 6 is applied to a three signal processing paths, 602, 604 and 606 and to two control signal paths, 608 and 610. Path 602 includes a 24 Hz film source video processor 612. Elements related to processor 612 include, in control signal path 610, a field- or frame-based motion detector 614 and a 24 Hz film pattern detector 616. Motion detector 614 detects motion between fields or frames of the input interlaced SDTV signal and sends a signal responsive to such motion to a 24 Hz film pattern detector 616. A field-based motion detector is preferred. Frame-based motion detectors are well known in the art. Although any of various prior art frame motion detectors may be employed, if a frame-based motion detector is employed, an improved frame motion detector as described below in connection with FIG. 11 is preferred. If a field-based motion detector is employed as motion detector 614, an improved field motion detector as described below in connection with FIGS. 8 and 9 is preferred. The 24 Hz film pattern detector 616 generates a field merge signal which is applied to the 24 Hz film source video processor 612 and a pattern YES/NO signal which controls switch 618. When a 24 Hz film pattern is detected, the film YES condition causes switch 618 to select the output the 24 Hz film source video processor as the decoder output.

Film pattern detector 616 looks for the pattern caused by a 24 Hz (24 frame/sec) motion picture film source in a 60 Hz NTSC signal. The detection of 3–2 pulldown 24 Hz film patterns in 60 Hz video signals is well known in the art. See, for example, said U.S. Pat. Nos. 4,876,596; 4,982,280; and 5,291,280. In the case of a 50 Hz PAL format input signal, which may carry 25 Hz (25 frame/sec) motion picture sources, the 24 Hz film pattern detector 616, the 24 Hz film source video processor 612 and the switch 618 are not required. The detection of 25 Hz film sources in 50 Hz PAL signals may be detected by the same decoder elements, described below, which detect a pseudo-film pattern in a 50 Hz PAL signal.

The film source video processing provided by processor 612 may be any known processing techniques for deriving progressively-scanned video signals from an interlaced film-source video signal, including, for example, any of the techniques disclosed in said three United States patents, cited just above.

When a 24 Hz film source is not detected, the output of a combiner 620, which receives the outputs of paths 604 and 606 as its inputs, is selected as the decoder output.

In path 608, a field-based motion detector 622 detects motion between fields and produces two motion signals, one responsive to high motion and another responsive to low motion. Details of such a motion detector are set forth below in connection with FIG. 8.

The field motion signal from the field-based motion detector 622 is applied to a pseudo-film pattern detector 624. A field-based motion detector is required to detect a pseudo-film pattern. In the case of an NTSC television signal input, for example, the pseudo-film detector looks for a pattern similar to that which would be caused by a 30 Hz (30 frame/sec) motion picture film source. In the presence of motion from frame-to-frame, when the video sequences in adjacent video fields are compared a 010101, etc. pattern results, indicating a pseudo-film source. Comparison of every second video field, to yield a 111111, etc., pattern, further confirms the pseudo-film source. Examining video frame motion in a frame-based motion detector would yield no useful information except for use as a field motion verification signal.

As explained above, the pseudo-film pattern differs from a true film pattern in that there are portions of the pairs of fields derived from the same progressively-scanned frame which are not derived from the same progressively-scanned frame due to transient occurrences of high motion. Thus, a modified 30 Hz film detector may be employed for the case of an NTSC signal input (or a modified 25 Hz film detector may be employed for the case of a PAL signal input). A 30 Hz film detector is disclosed in said U.S. Pat. No. 4,982,280. An improvement on the 30 Hz film detector is disclosed in said WO 94/30006 Published International Application (although the WO publication is directed to detecting a 25 Hz film source in a 50 Hz PAL system, the same principles apply to detection of a 30 Hz film source in a 60 Hz NTSC system). It is preferred that an improvement of the WO 94/30006 detector, described below in connection with FIG. 11, should be employed as the pseudo-film detector in the decoder of the present invention.

A detector designed for film source detection may require some modification such that, in the case of NTSC, for example, it ignores areas of high motion within an otherwise low motion pattern. Subject to, for example, a threshold intended to eliminate false indications due to noise, the detector should generate a pseudo-pattern YES condition signal in response to all fields in which any portion of the field includes only low motion. As discussed above in connection with the encoder, almost all fields are part of a pseudo-film pattern and the pattern is broken only when a field having all high motion is detected, resulting, for example, from the camera source's fast panning of a fully still scene, which is very rare. Such motion detector and pattern detector action required to provide the necessary action in the decoder are not disclosed in said U.S. Pat. No. 4,620,225.

The pseudo-film pattern detector 624 and the high-motion motion signal from motion detector 622 control a switch or combiner 620 which selects either the output of a pseudo-film source video processor 626 or the output of a conventional video processor 628 or some combination of the two. The pseudo-film processor 626 provides for decoding of a pseudo-film signal created by the encoder of the present invention, thereby creating an excellent reconstruction of the input to the encoder.

The conventional video processing function 628 allows a video signal created by a source other than the encoder of the present invention to be processed. The conventional video interlace-to-progressive scan converter 628 may be any of various known interlace-to-progressive scan converters or de-interlacers (sometimes known as line doublers), preferably of the adaptive type which operates on an interfield basis (merging, for example, pairs of fields or a field with an average of the field occurring before and after it) for conditions of low motion and on an intrafield basis (creating new scanning lines by interpolation from lines within the same field). The pseudo-film processor 626 is preferably an interlace-to-progressive field-merge-type de-interlacer, a type of line doubler (lines from pairs of interlaced fields are merged to produce the progressively scanned lines). Such line doublers are well known in the art. See, for example said U.S. Pat. Nos. 5,159,451 and 4,876,596 and said Published International Patent Application WO 94/30006.

It should be understood that while the function of the decoder is explained by reference to several paths, practical embodiments providing substantially the same functions and results may be implemented in other ways. For example, in practice, the 24 Hz film pattern detector 616 and the pseudo-film pattern detector 624 may be at least partially combined. Alternatively, or in addition, for example, portions of the pseudo-film source video processor 626 and the conventional video processor 628 may be at least partially combined. Alternatively, or in addition, for example, portions of the field-based motion detector 622 and the field and/or frame-based motion detector may be combined.

The decoder output may also be applied to an optional upconverter 630 if it is desired to alter the encoder output to accommodate the HDTV format or other format of the viewer's television set. Upconverter 630 may, for example, increase the number of progressive scan lines, increase the progressive frame rate, perform a progressive-to-interlace conversion to an interlaced HDTV format or alter the aspect ratio.

Details of the combiner 620 are shown schematically in FIG. 7 as comprising a first switch 702 and a second switch in the nature of a fader or soft switch, depicted as a potentiometer 704. Switch 702 is controlled by the pseudo-film pattern YES/NO signal such that a YES condition places the switch in its upper position in which it selects the tap of the potentiometer. A NO condition places the switch in its lower position in which it selects the output of the conventional video processor 628 (FIG. 6). The high-motion motion signal from motion detector 622 (FIG. 6) controls the position of the potentiometer tap and therefore the degree to which the output of one path or another or some mixture of the two is taken as the decoder output. Thus, the potentiometer 704 functions as a fader or soft switch. In practice, the switch may be implemented in any of various ways (electronically or by software, for example) which allow its rapid control such that changes in path selection within a field are accomplished in real time. It should also be understood that in practice, the functions of switches 708 and 710 may be combined.

Referring now to FIG. 8, which shows the field-based motion detector in more detail, the input signal designated "$Y_{in}$" is applied to an array of field and line memories 802. The array of memories 802 provides three outputs comprising time-delayed versions of $Y_{in}$, which, along with $Y_{in}$ itself, provide four time-spaced versions of the input luminance signal: one in a first television field F0, two in a second television field F1 and one in a third television field F2.

The time-spacing of the six signal streams with respect to the spatial location of pixels (television picture elements) in the three consecutive fields may be better understood by reference to the representation of FIG. 8A. FIG. 8A is a quasi-three-dimensional representation in which the vertical and horizontal dimensions lie in the plane of a television picture field such that the vertical axis is the vertical direction of a television picture field, perpendicular to the scan lines, the horizontal axis is the horizontal direction of the television picture field, parallel to the scan lines, and the direction perpendicular to the plane of each field is a quasi-time axis in which each consecutive field is shown at a discrete time. At some arbitrary time during the active picture information of a television field, a pixel may be represented as point P(F0) in field F0. That pixel is shown in FIG. 8A as a point in a horizontal scan line. A first pixel in field F1, occurring 262 lines (in the case of NTSC, for PAL, 312 lines) after pixel P(F0), and a second pixel in field F1, occurring 263 lines (in the case of NTSC, for PAL 313 lines) after pixel P(F0), may referred to as pixel P(F1−½H) and pixel P(F1+½H), respectively. Pixel P(F1−½H), shown as a point in a first horizontal scan line, is directly above pixel P(F1+½H) vertically, which pixel is shown as a point in the next lower horizontal scan line. A point P(F1) in field F1, corresponding spatially to the location in which pixel P(F0) of field F0 lies, is half way between pixel P(F1−½H) and pixel P(F1+½H) due to the interlacing offset of horizontal scan lines from field to field. Thus, pixel P(F1−½H) precedes, by the time of one-half line, the point P(F1), while pixel P(F1+½H) is, by the time of one-half line, after the point P(F1). The spatial point in field F2 corresponding to that of pixels P(F0) and P(F1) is the location of pixel P(F2), occurring 525 lines, exactly one frame or two fields, after pixel P(F0). Pixel P(F2) is shown as a point in a horizontal scanning line in field F2.

Returning again to FIG. 8, wherein the details of the array of field and line memories 802 are shown, the undelayed input luminance signal stream $Y_{in}$ itself provides the F0 output stream. The input luminance signal stream $Y_{in}$ is applied to a first nH delay 804 (where n is 262 lines for NTSC, 312 lines for PAL) to provide the F1−½H output stream. The output of delay 804 is applied to a 1H (one horizontal line) delay 806 to provide the F1+½H output stream. The delay 806 output is applied to a further nH delay (where n is 262 lines for NTSC, 312 lines for PAL) 808 to provide the F2 output stream. The delays may be implemented by various hardware, software and hybrid hardware/software techniques well known to those of ordinary skill in the art. Although shown as a series of delays, the delays may be implemented in other ways such as by a multiport random access memory in which the signal stream is read in once and read out multiple times, or by other equivalent ways.

Thus, the array of memories 802 provides four signal output streams corresponding to four pixel locations in three consecutive fields: a pixel at time position F0 in field 0, pixels at time positions F1−½H and F1+½H in field F1, and a pixel at time position F2 in field 2.

A field 0 motion detector 814, described below, receives the F0, F1−½H and F1+½H signal streams, signals spaced apart in time by one field minus one-half line and by one field plus one-half line. It is known to apply such inputs to field motion detectors—see, for example, U.S. Pat. Nos. 4,982,280 and 5,291,280. The purpose of the field motion detector is to detect motion (having a velocity greater than, for example, one half line per field) from interlaced field to interlaced field without falsely detecting motion when a vertical transition occurs (for example, when the portion of the picture below a horizontal line is black and the portion of the picture above the line is white, or vice-versa). Although a field motion detector of the type disclosed in said U.S. Pat. No. 5,291,280 may be employed in aspects of the present invention, it is preferred to employ the improved field motion detector described below because of its greater resistance to false detection caused by certain types of vertical transitions. While a field motion detector such as that of the U.S. Pat. No. 4,982,280 may be employed, the field motion detector of said U.S. Pat. No. 5,291,280 is preferable to that of the U.S. Pat. No. 4,982,280 in that the earlier patent provides no immunity at all to false detection resulting from vertical transitions. The output of the field 0 motion detector 814, $F0_{mtn}$, which, in a digital embodiment is a multibit word indicating motion amplitude, provides a field to field motion signal which is applied to the pseudo-film pattern detector 624 (FIG. 6). The $F0_{mtn}$ signal is also used as one of two signals for deriving a high-motion motion signal, as described below.

A second field motion detector, field 2 motion detector 816 receives the F2, F1−½H and F1+½H signal streams, signals also spaced apart in time by one field minus one-half line and by one field plus one-half line. Alternatively, instead of employing a second field motion detector, the output of the first field motion detector may be delayed by one field (in practice, by one field plus or minus a half line). The output of the field 2 motion detector 816, $F2_{mtn}$, which, in a digital embodiment is a multibit word indicating motion amplitude, also provides a field to field motion signal which is, with the $F0_{mtn}$ signal, usable to derive a high-motion motion signal, as described below. If desired, the $F2_{mtn}$ signal may be used, in the manner described below, to verify the pseudo-film pattern detected using the $F0_{mtn}$ signal.

Motion detectors 814 and 816, or their functional equivalents, compare corresponding pixels in three successive fields, P(F0), P(F1) and P(F2) (it being understood that due to the interlace offset, in the middle field pixels just above and just below the picture location corresponding to pixels P(F0) and P(F2) are employed). There are four possibilities with respect to the three pixels:

1) P(F0)=P(F1)=P(F2)
2) P(F0)≠P(F1)=P(F2)
3) P(F0)=P(F1)≠P(F2)
4) P(F0)≠P(F1)≠P(F2)

Case one indicates no motion. Cases two and three indicate low motion and case four indicates high motion. Thus, a Boolean exclusive-OR function indicates low motion and a Boolean AND function indicates high motion as illustrated in the following table:

| Field 0– Field 1 | Field 1– Field 2 | Low Motion (Exclusive-OR) | High Motion (AND) |
|---|---|---|---|
| 0 | 0 | 0 | 0 |
| 1 | 0 | 1 | 0 |
| 0 | 1 | 1 | 0 |
| 1 | 1 | 0 | 1 |

By imposing a low-level threshold on the $F0_{mtn}$ and $F2_{mtn}$ signals so as to convert them to binary form, the Boolean AND function operating on the resulting binary signals generates an indication of high motion conditions. That indication may be used to select either the $F0_{mtn}$ signal or the $F2_{mtn}$ signal which has the greater amplitude or some combination of the two signals (such as their average amplitude) to produce the high motion signal for control of combiner 620 (FIG. 6). The $F0_{mtn}$ signal, the $F2_{mtn}$ signal and the resulting high motion signal indicate the motion amplitude and, in a digital implementation, are multibit words. Preferably, a logic function 818 provides such appropriate Boolean AND and selection or combining functions.

When the Boolean AND function is zero, indicating any of the first three cases, the high motion control signal causes the combiner 620 (FIG. 6) to select only the pseudo-film source video processor 626 output. When the Boolean AND function is one, indicating the third case, the high motion control signal causes the fader or soft switch function of the combiner 620 to swing between the pseudo-film and conventional processors in accordance with the amplitude of the motion (greater motion moving the fader toward the conventional video processor output).

In addition, if logic 818 includes an Exclusive-OR function responding to binary-converted forms of the $F0_{mtn}$ and $F2_{mtn}$ signals, a further signal may be provided to verify the pseudo-film mode condition. Alternatively, this further signal may be used to in conjunction with a modified pseudo-film pattern detector. The detector could be modified, for example, to identify a field as a pseudo-film field so long as the field did not contain any occurrences of the fourth condition (i.e., P(F0)≠P(F1)≠P(F2)).

The field-based motion detector 622 (FIG. 6) may be used in place of the field or frame-based motion detector 614 (FIG. 6), in which case the F0$_{mm}$ signal (FIG. 8) is applied to the 24 Hz film pattern detector 616 (FIG. 6) and to the conventional video processor 628 (FIG. 6).

If operated as part of an encode/decode system, particularly if the system is physically at a single location, the decoder may receive a pseudo-film YES/NO signal, a field merge signal, and/or a high-motion signal from the encoder. Alternatively, by convention, if the encoder always generated an interlaced frame in which an even parity field is followed by an odd parity field (or vice-versa) and those two fields were the fields to be merged by the decoder, then the decoder could be simplified and there would be no need to transmit a field merge marker signal. Such a convention is most practicably implemented at a single location or within a system operated under unified technical standards. Preferably, if the system is physically at a single location, all three signals are provided (or the convention is practiced, which makes it unnecessary to provide the field merge signal). This has the advantage of deriving both the encoder and decoder control signals from the high-resolution input signal which has an excellent signal-to-noise ratio.

Details of the field motion detectors of FIG. 8 are shown in FIG. 9 (a single field motion detector as shown in FIG. 8, along with the appropriate delay memories may be used as motion detector 614). Each field motion detector compares temporally adjacent pixel information of opposing field parity (field 0 and field 1, for example) and differentiates field-to-field motion from vertical picture transitions to provide a field motion signal.

Each field motion detector includes three subtractors (902, 904 and 906), a keep-smaller-absolute-value function 908, a magnitude comparator 910, and a motion/no-motion switch 912. Subtractor 902 receives the F1–½H and F0 signals. Subtractor 904 receives the F0 and F1+½H signals. Subtractor 906 receives the F1–½H and F1+½H signals. The field motion detector described in U.S. Pat. No. 5,291,280 (see, e.g., FIG. 3) employs subtractors 902 and 904, receiving the same inputs as just described, and the keep-smaller-absolute-value function 908. The field motion detectors of the present invention may use the same keep-smaller-absolute-value function arrangement as in said U.S. Pat. No. 5,291,280.

Inter-field subtractions yield field motion but also incorrectly detect vertical transitions as motion. The keep-smaller-absolute-value function chooses the smaller of the two inter-field subtractions and thereby differentiates high frequency vertical transitions from motion. Unfortunately low frequency vertical transitions are still detected as motion. To overcome this shortcoming, this preferred field motion detector adds a single line vertical differentiator (the third subtractor 906), whose output, a measure of vertical energy, is compared in magnitude comparator 910 to the output of the keep-smaller-absolute-value function 908, an measure of field motion. Subtractor 906, functioning as a single line vertical differentiator, looks for a vertical transition within a field. If the magnitude of the vertical transition is greater than the magnitude of the field motion, then a vertical transition was incorrectly determined to be motion so the output switch goes to the NO position and no motion is detected. However, if the field motion is greater than the vertical energy, the motion value YES is output. This yields a more precise motion detection. It will be noted that sign of motion information signals from the subtractors are irrelevant in view of the keep-smaller-absolute-value function.

A preferred form of a frame motion detector for use as motion detector 614 (FIG. 6) (if a frame motion detector is used instead of a field motion detector) is shown in detail in FIG. 10, in which F0 and F2 video stream signals are compared on a pixel by pixel basis to determine if the corresponding pixel in field F1 is likely to be in motion. A one frame memory delay (not shown) is used to provide the F2 video stream signal.

In the frame motion detector described in said U.S. Pat. No. 4,982,280, high frequency motions are filtered out. This was done to keep any subcarrier residue from being detected as motion. The preferred frame motion detector of FIG. 10 provides improved differentiation of motion and subcarrier signal components.

A frame subtraction is performed between F0 and F2 in subtractor 1002. The subtractor 1002 output is then put through complementary lowpass and highpass filters created by a lowpass filter 1004 and subtractor 1006. In a digital embodiment, the lowpass filter may be a five-tap FIR filter with a zero at the color subcarrier frequency (in a frame detector intended for use with both NTSC and PAL, the filter characteristics may be switchable in accordance with whether an NTSC or PAL signal is being processed). The horizontal lowpass filtered path (where most of the motion lies) on line 1008 is rectified in rectifier 1010, and applied to a threshold function 1012 which removes noise components by applying a motion LPF noise threshold. In a digital implementation, the threshold 1012 may, for example, limit the signal to four bits (from, say, eight bits). The horizontal highpass filtered path on line 1014 goes into complementary vertical lowpass and highpass filters created by subtractor 1016, adder 1018 and delay 1020 (which provides a one-line delay for NTSC and a two-line delay in PAL). These paths, vertical HPF path 1022 and vertical LPF path 1024, are then individually rectified in rectifiers 1026 and 1028, respectively, and have their own thresholds (threshold functions 1030 and 1032, respectively, which remove noise components by applying a motion HHPF-VHPF Noise threshold and a motion HHPF-VLPF Noise threshold, respectively) (where HHPF is horizontal highpass filter, etc.). In a digital implementation, the thresholds 1030 and 1032 may also limit the respective signals to 4 bits.

Thus, three paths are provided: a horizontally lowpass filtered (HLPF) path, a horizontally highpass filtered and vertically highpass filtered (HHPF-VHPF) path, and a horizontally highpass filtered and vertically lowpass filtered (HHPF-VHPF) path. The purpose of three paths is to separate color subcarrier signal components from true motion information. The HLPF path output has substantially no subcarrier signal components as a result of the horizontal lowpass filtering action of LPF 1104. The two HHPF paths, carrying the complement of the HLPF path, require vertical filtering to reduce the subcarrier signal components present in the high-frequency portion of the spectrum. Such components have the appearance of a vertical line pattern which may occur in real television scenes. The filtering action of the HHPF-VHPF path passes low amplitude level subcarrier signal components. By setting the HHPF-VHPF threshold sufficiently high, true motion is differentiated from the subcarrier components. The filtering action of the HHPF-VLPF path rejects subcarrier components (which have a vertical component because they are out-of-phase from line to line) but passes horizontally moving patterns of lines (referred to as "moving multiburst") which must be detected as motion (such a pattern is rejected by the other two paths).

The HHPF-VLPF path may have a lower threshold level than does the HHPF-VHPF path because the HHPP-VLPF path is not differentiating desired from undesired signal components based on amplitude. The HLPF and HHPF-VLPF threshold levels are selected for noise immunity.

The three differently filtered motion paths are then combined in summer 1034 and expanded in expansion function 1036. Preferably, they are expanded horizontally by 5 pixels, temporally by 1 field and vertically by 1 line. Techniques for such horizontal, vertical and temporal expansion are known. See for example, said U.S. Pat. No. 5,488,422. The output of block 1036 is applied to one input of a keep greater value function 1038 and to a 262H/312H (262 lines for NTSC, 312 lines for PAL) delay 1040, the output of which is applied as a second input to block 1038, and to a 1H (one line) delay 1042, the output of which is applied as a third input to block 1038. Blocks 1036–1042 provide a temporally and vertically expanded motion signal.

The purpose of the temporal and vertical expansion is twofold—to avoid the situation when a fast moving object leaves a "hole" between frames (e.g., a swinging pendulum) and, in the case of an NTSC signal, to avoid an appearance of fluttering between sharp and soft pictures when film material is not detected as film material. Also, expansion assures that the frame motion signal "surrounds" the field motion signal in the pseudo-film detector.

The frame motion detector has three adjustable parameters: the motion LPF noise threshold, the motion HHPF-VLPF noise threshold, and the motion HHPF-VHPF noise threshold. The parameters should be adjusted to as to minimize false detection of motion caused by noise and subcarrier signal components.

Details of the pseudo-film pattern detector 624 are shown in FIG. 11. The purpose of the pseudo-film pattern detector 624 (FIG. 6) is to determine the onset of a pseudo-film pattern, thus entering the pseudo-film mode (indicated by putting the pseudo-film YES/NO signal in its YES condition), and, after entering the pseudo-film mode, when the pseudo-film pattern is broken, exiting the pseudo-film mode (indicated by putting the pseudo-film YES/NO signal in its NO condition). The pseudo-film pattern detector 624 receives the field motion signal from field-based motion detector 622. The pseudo-film pattern detector is basically the same as a PAL film detector, which looks for 25 Hz sources in a 50 Hz television signal or an NTSC 30 Hz film detector, which looks for 30 Hz sources in a 60 Hz television signal. A field-based film detector for detecting 25 frame/second motion in PAL television signals is disclosed in said Published International Patent Application WO 94/30006, while a field-based film detector for detecting 30 frame/second motion in NTSC television signals is disclosed in said U.S. Pat. No. 4,982,280.

Referring now to FIG. 11, the pseudo-film detector examines the accumulated field motion between field 0 and field 1 and then searches for the 30 Hz (30 Hz for NTSC, 25 Hz for PAL) field motion pseudo-film sequence pattern "1 0" before determining if the material is pseudo-film and not other video. The pseudo-film detector receives the $F0_{mtn}$ output signal of the field 0 motion detector 813 (FIG. 8). The field motion signal is filtered in low-pass filter 1102 to remove subcarrier residue, rectified in rectifier 1104, and blanked by pseudo-film motion blanking function 1106 to keep any picture edge artifacts and subtitles from being detected as motion. The rectified and blanked motion signal is then applied to a threshold 1108 to reduce noise artifacts. The threshold is set by a fixed and predefined pseudo-film noise threshold. In a parallel path, the motion input from a frame motion detector (if used) is thresholded by a threshold 1110 into, in a digital implementation, a one-bit motion yes/no signal. This threshold is set by a motion threshold. The one-bit motion yes/no signal is then used to control a motion-no motion switch 1112. The optional frame motion indication serves as a verification of the field motion indication—if there is no frame motion at a given pixel then there cannot be any field motion for the same pixel (the frame motion has been expanded horizontally and vertically to assure that the band of frame motion surrounds the field motion). The one-bit field motion signal from switch 1112 is then accumulated over the entire field in a field rate accumulator 1114.

The recurring pseudo-film sequence "1 0" can occur on standard video material for a few frames in a row so care must be taken to differentiate pseudo-film source video from conventional video. First the current field motion (B) from field rate accumulator 1114 is compared, in comparator 1140, in magnitude with the last field motion (A), derived by delaying the field rate accumulator 1114 output in a 1 field delay 1142 (which may be implemented as a flip-flop clocked at the field rate by the vertical sync signal) to form a motion sign signal at the comparator 1140 output.

If the current value is greater than the previous motion value a "1" is output, conversely a "0" is output if the current value is less than or equal to the previous motion. In a parallel path the two motions, the current field motion (B) and the last field motion (A), are modified by an operator 1144 to form the ratio $|(A+B)/[(A-B)/2]|$. This function, the absolute value of the difference divided by the average, corresponds to an adjacent field motion ratio, which is then passed to a threshold 1146 whose output is gated in AND-gate 1148 with the motion sign signal. The introduction of the minimum motion constraint is required because the motion sign signal does not care if the difference between A and B is 1 or 1000. For video material it is not uncommon to obtain motion values such as the following: 1000, 1410, 1400 and 1510. These would yield a "0 1 0 1" from the motion sign signal—a film-like pattern. A small motion pseudo-film source might have the values as follows: 6, 100, 5, 110. Thus a pseudo-film minimum motion ratio will help differentiate between pseudo-film and other video.

Alternatively, but less desirably, the arrangement in the pseudo-film detector between the field rate accumulator 1114 and the state machine 1130 may be modified by substituting the arrangement of FIG. 12, described below.

If the minimum motion ratio constraint is met, then the motion sign is fed into the pseudo-film state machine 1150, which may be the same type of state machine as in said U.S. Pat. No. 4,982,280. If not, a 0 is input. Pseudo-film mode is entered once the number of film sequences reaches the pseudo-film sequence acquisition number. Exiting the pseudo-film mode occurs when the pseudo-film sequence is disrupted by a field in which the entire field is high motion.

The pseudo-film detector has eight adjustable parameters: a pseudo-film noise threshold, a motion threshold, a pseudo-film sequence acquisition number, a minimum motion ratio and four pseudo-film blanking parameters that define the area of pseudo-film motion detection: pseudo-film blanking top line, pseudo-film blanking bottom line, pseudo-film blanking right side, and pseudo-film blanking left side.

FIG. 12 shows an alternative arrangement for a portion of the pseudo-film detector of FIG. 11. At the end of each field the data is latched in and the motion value is then passed from field rate accumulator 1114 (FIG. 11) into three parallel paths, 1216, 1218 and 1220: 1) path 1216 to a minimum of five field detector 1222 (although a minimum of five fields is preferred to provide a safety margin, a minimum of three fields is practicable), 2) path 1218 to a three field weighted averager 1224, and 3) path 1220 to one side of a subtractor 1226 where end-of-field calculations are performed. At the beginning of each field the accumulators are reset.

Because the field motion is not precise, a non-moving field might have a non-zero value associated with it. The minimum-of-five field detector 1222 looks at five adjacent fields for the minimum motion. For pseudo-film in five adjacent fields there will always be a non-moving field, and therefore the minimum motion value will correspond to it. This output provides the other input to the subtractor 1226 in order to remove the base motion value associated with a non-moving field from the accumulator 1214 output on path 1220. The subtractor 1226 output is then passed to a variable threshold 1228 whose threshold is determined by the output of block 1224, the weighted average of three fields.

Inasmuch as the motion threshold is dependent on the motion of the picture information, picture information with little motion will have a lower threshold than material with lots of motion. The minimum motion detector 1222 and the weighted averager 1224 greatly increase the sensitivity of pseudo-film detection on small moving scenes and factor out computer generated material which violates the Nyquist criterion. The output of the variable threshold 1228, a "1" for a moving field and a "0" for a non-moving field, is then fed into the state machine 1130 (FIG. 11).

We claim:

1. Apparatus for deriving a interlaced SDTV signal from a progressively-scanned television signal having substantially the number of active picture scanning lines in a frame as the interlaced SDTV signal has in a frame (i.e., two interlaced fields) and having a progressive scan frame rate substantially the same as the interlace field rate of the compatible standard-bandwidth television signal, said progressively-scanned television signal created by or derived from a HDTV source, comprising a low-motion signal processor receiving the progressively-scanned television signal and providing a interlaced SDTV signal having a field rate substantially the same as said progressive scan frame rate, but in which changes in the television signal active picture information do not exceed the interlaced television signal frame rate, said low-motion signal processing path including a time-domain lowpass filter, a high-motion signal processor receiving the progressively-scanned television signal and providing a interlaced SDTV signal having a field rate substantially the same as said progressive scan frame rate, in which changes in the interlaced television signal active picture information may exceed the interlaced television signal frame rate but do not exceed the interlaced television signal field rate, a motion control generator receiving the progressively-scanned television signal and providing a motion control signal, derived from differences in picture information from frame to frame of said progressively-scanned television signal, indicating the degree of motion in said progressively-scanned television signal, and a switch, controlled by said motion control signal, receiving the signal output of said low-motion signal processor and the signal output of said high-motion signal processor for selecting either of said signal outputs or a mixture of said signal outputs, in accordance with the degree of motion indicated by said motion signal, to produce said interlaced SDTV signal, the signal having a varying motion resolution.

2. Apparatus according to claim 1 wherein said low-motion signal processor comprises said time-domain lowpass filter, said filter receiving the progressively-scanned television signal and providing a time-domain lowpass filtered progressively-scanned television signal, a drop frame and repeat frame processor receiving the time-domain lowpass filtered progressively-scanned television signal, eliminating every other progressively-scanned frame and repeating every non-eliminated frame, providing pairs of processed identical progressively-scanned television signal frames having the same frame rate as the progressively-scanned television signal received by said time-domain lowpass filter, the processed progressively-scanned television signal having a motion resolution of one-half its progressive scan frame rate, and an interlacer receiving the processed progressively-scanned television signal and providing an interlaced television signal having substantially the number of active picture scanning lines in a frame (i.e., two interlaced fields) as the processed progressively-scanned television signal has in a frame and having an interlace field rate substantially the same as the frame rate of the processed progressively-scanned television signal, the interlacer creating the two opposite parity fields of each interlaced frame from each pair of identical progressively-scanned frames, respectively, wherein the interlacer drops every other line in the pairs of identical progressively-scanned frames, the dropped lines being offset by one line from frame to frame.

3. Apparatus according to claim 1 or claim 2 wherein said high-motion signal processor comprises a space-domain lowpass filter receiving the progressively-scanned television signal and providing a space-domain lowpass filtered progressively-scanned television signal, said space-domain lowpass filter acting at least in the vertical domain, and an interlacer receiving the space-domain lowpass filtered progressively-scanned television signal and providing an interlaced television signal having substantially the number of active picture scanning lines in a frame (i.e., two interlaced fields) as the space-domain lowpass filtered progressively-scanned television signal has in a frame and having an interlace field rate substantially the same as the frame rate of the space-domain lowpass filtered progressively-scanned television signal, the interlacer creating the two opposite parity fields of each interlaced frame from consecutive pairs of space-domain lowpass filtered progressively-scanned frames, wherein the interlacer drops every other line in the progressively-scanned frames to create each field, the dropped lines being offset by one line from frame to frame.

4. The apparatus of claim 3 wherein said space-domain lowpass filter provides filtering in the vertical domain and in the horizontal domain.

5. Apparatus according to claim 1 wherein said apparatus also provides said motion control signal as an output in addition to said interlaced SDTV signal.

6. Apparatus according to claim 1 wherein said low-motion signal processing path includes a drop frame and repeat processor which eliminates every other progressively-scanned frame and repeats every non-eliminated frame, and an interlacer which derives the fields of each interlaced frame from the respective repeated progressive frames, the apparatus generating a signal indicating which pair of interlaced fields are properly paired together, and wherein said apparatus also provides said signal as an output in addition to said interlaced SDTV signal.

7. Apparatus according to claim 1 wherein said motion control generator generates a motion control signal responsive to motion in portions of a television frame such that the motion control signal controls said switch so as to vary its selection of processors during a field of the produced interlaced television signal.

8. Apparatus according to claim 7 wherein said motion control generator detects differences between frames on a pixel-by-pixel basis.

9. Apparatus according to claim 7 wherein said motion control generator detects differences between frames on a block-by-block basis, wherein a block is a group of pixels within a frame.

10. Apparatus according to claim 7 wherein said motion control generator signal also generates a pseudo-film YES/NO signal responsive to motion in an entire television frame, such as resulting from rapid panning of a still scene by the source television camera.

11. Apparatus according to claim 1 or 2 wherein said time-domain lowpass filter provides no filtering action below a signal threshold level.

12. Apparatus according to claim 3 wherein said space-domain lowpass filter provides no filtering action below a signal threshold level.

13. A method for deriving a interlaced SDTV signal from a progressively-scanned television signal having substantially the number of active picture scanning lines in a frame as the interlaced SDTV signal has in a frame (i.e., two interlaced fields) and having a progressive scan frame rate substantially the same as the interlace field rate of the SDTV signal, said progressively-scanned television signal created by or derived from a HDTV source, comprising providing a first intermediate interlaced television signal, time-domain lowpass filtered and having a field rate substantially the same as said progressive scan frame rate, but in which changes in the television signal active picture information do not exceed the interlaced television signal frame rate, providing a second intermediate interlaced television signal having a field rate substantially the same as said progressive scan frame rate, in which changes in the interlaced television signal active picture information may exceed the interlaced television signal frame rate but do not exceed the interlaced television signal field rate, providing a motion control signal, derived from differences in picture information from frame to frame of said progressively-scanned television signal, indicating the degree of motion in said progressively-scanned television signal, and selecting said first intermediate interlaced television signal and said second intermediate interlaced television signal in response to said motion control signal such that, in accordance with the degree of motion indicated by said motion signal, one of said intermediate interlaced television signals is selected or a mixture of said intermediate interlaced television signals is selected, to produce said interlaced SDTV signal.

14. Apparatus for deriving a progressively-scanned television signal from a interlaced SDTV signal, comprising a motion control generator receiving the interlaced SDTV signal and providing a motion control signal, derived from field-to-field differences, indicating the degree of motion in said interlaced SDTV signal, said motion control generator including a pattern detector providing a pattern YES/NO signal, where YES indicates the detection of a pseudo-film pattern and NO indicates the non-detection of a pseudo-film pattern, and a field merge signal, the field merge signal indicating, when the pattern YES/NO signal is in its YES condition, which pairs of interlaced fields are derived from the same pseudo-film frame, a low-motion signal processor, controlled by said field merge signal, receiving the interlaced SDTV signal and providing two identical progressively-scanned television signal frames from each pair of interlaced fields identified by said field merge signal, a high-motion signal processor receiving the interlaced SDTV signal and providing a progressively-scanned television signal having a frame rate the same as the field rate of said interlaced television signal, in which each frame is derived from at least one field of said interlaced SDTV signal, a switch, controlled by said motion control signal and said pattern YES/NO signal, receiving the signal output of said low-motion signal processor and the signal output of said high-motion signal processor for selecting, when the pattern YES/NO signal is in its YES condition, in accordance with the degree of motion indicated by said motion signal, one of said signal outputs or a mixture of the two signal outputs, the resulting signal having a varying motion resolution, and for selecting, when the pattern YES/NO signal is in its NO condition, the output of said high-motion signal processor, to produce said progressively-scanned television signal.

15. Apparatus according to claim 14 wherein said motion control generator detects differences between fields on a pixel-by-pixel basis.

16. Apparatus according to claim 14 wherein said motion control generator detects differences between fields on a block-by-block basis, wherein a block is a group of pixels within a frame.

17. Apparatus according to claim 14 wherein said motion control generator signal also generates a pseudo-film YES/NO signal.

18. Apparatus according to any one of claims 14–17 wherein said motion control generator signal indicates the degree of motion based on velocity, amplitude and size.

19. Apparatus according to claim 14 further comprising an upconverter for converting said progressively-scanned television signal to a progressively-scanned television format having a higher number of scanning lines and/or a higher frame rate.

20. Apparatus according to claim 14 further comprising an upconverter for converting said progressively-scanned television signal to an interlaced television format having a higher number of scanning lines and/or a higher frame rate.

21. A method for deriving a progressively-scanned television signal from a interlaced SDTV signal, comprising providing a motion control signal based on field-to-field differences in the interlaced SDTV signal, said motion control signal indicating the degree of motion in said interlaced SDTV signal, providing a pattern YES/NO signal, where YES indicates the detection of a pseudo-film pattern and NO indicates the non-detection of a pseudo-film pattern in said interlaced SDTV signal, providing a field merge signal, the field merge signal indicating, when the pattern YES/NO signal is in its YES condition, which pairs of interlaced fields are derived from the same pseudo-film frame, providing a first intermediate progressively-scanned television signal made up of two identical progressively-scanned television signal frames from each pair of interlaced fields identified by said field merge signal in said interlaced SDTV signal, providing a second intermediate progressively-scanned television signal in which each frame is derived from at least one field of said interlaced SDTV signal, the progressively-scanned television signal having a frame rate the same as the field rate of said interlaced television signal, and selecting said first intermediate progressively-scanned television signal and said second intermediate progressively-scanned television signal in response to said motion control signal and said pattern YES/NO signal such that, when the pattern YES/NO signal is in its YES condition, in accordance with the degree of motion indicated by said motion signal, one of said intermediate progressively-scanned television signals is selected or a mixture of said intermediate progressively-scanned television signals is selected, the resulting signal having a varying motion resolution, or, when the pattern YES/NO signal is in its NO condition, the output of said, said second intermediate progressively-scanned television signal is selected, to produce said progressively-scanned television signal.

22. A system for deriving a interlaced SDTV signal from a progressively-scanned television signal having substantially the number of active picture scanning lines in a frame as the interlaced SDTV signal has in a frame (i.e., two interlaced fields) and having a progressive scan frame rate substantially the same as the interlace field rate of the compatible standard-bandwidth television signal, said progressively-scanned television signal created by or derived from a HDTV source, and for deriving a progressively-scanned television signal from a interlaced SDTV signal, comprising:

an encoder including:

a low-motion signal processor receiving the progressively-scanned television signal and providing a interlaced SDTV signal having a field rate substantially the same as said progressive scan frame rate, but in which changes in the television signal active picture information do not exceed the interlaced television signal frame rate, said low-motion signal processing path including a time-domain lowpass filter, a high-motion signal processor receiving the progressively-scanned television signal and providing a interlaced SDTV signal having a field rate substantially the same as said progressive scan frame rate, in which changes in the interlaced television signal active picture information may exceed the interlaced television signal frame rate but do not exceed the interlaced television signal field rate, a motion control generator receiving the progressively-scanned television signal and providing a motion control signal, derived from differences in picture information from frame to frame of said progressively-scanned television signal, indicating the degree of motion in said progressively-scanned television signal, and a switch, controlled by said motion control signal, receiving the signal output of said low-motion signal processor and the signal output of said high-motion signal processor for selecting either of said signal outputs or a mixture of said signal outputs, in accordance with the degree of motion indicated by said motion signal, to produce said interlaced SDTV signal, the signal having a varying motion resolution, and a decoder comprising:

a motion control generator receiving the interlaced SDTV signal and providing a motion control signal, derived from field-to-field differences, indicating the degree of motion in said interlaced SDTV signal, said motion control generator including a pattern detector providing a pattern YES/NO signal, where YES indicates the detection of a pseudo-film pattern and NO indicates the non-detection of a pseudo-film pattern, and a field merge signal, the field merge signal indicating, when the pattern YES/NO signal is in its YES condition, which pairs of interlaced fields are derived from the same pseudo-film frame, a low-motion signal processor, controlled by said field merge signal, receiving the interlaced SDTV signal and providing two identical progressively-scanned television signal frames from each pair of interlaced fields identified by said field merge signal, a high-motion signal processor receiving the interlaced SDTV signal and providing a progressively-scanned television signal having a frame rate the same as the field rate of said interlaced television signal, in which each frame is derived from at least one field of said interlaced SDTV signal, a switch, controlled by said motion control signal and said pattern YES/NO signal, receiving the signal output of said low-motion signal processor and the signal output of said high-motion signal processor for selecting, when the pattern YES/NO signal is in its YES condition, in accordance with the degree of motion indicated by said motion signal, one of said signal outputs or a mixture of the two signal outputs, the resulting signal having a varying motion resolution, and for selecting, when the pattern YES/NO signal is in its NO condition, the output of said high-motion signal processor, to produce said progressively-scanned television signal.

* * * * *